United States Patent [19]
Harakawa et al.

[11] Patent Number: 4,805,074
[45] Date of Patent: Feb. 14, 1989

[54] SOLID ELECTROLYTIC CAPACITOR, AND METHOD OF MANUFACTURING SAME

[75] Inventors: Yoshihiro Harakawa; Koji Izawa; Hidemitsu Takeuchi; Shinji Nakamura; Sadamu Toita, all of Kawasaki, Japan

[73] Assignee: Nitsuko Corporation, Kanagawa, Japan

[21] Appl. No.: 101,692

[22] Filed: Sep. 28, 1987

[30] Foreign Application Priority Data

Mar. 20, 1987 [JP] Japan .................................. 62-67172
Mar. 27, 1987 [JP] Japan .................................. 62-73741
Mar. 30, 1987 [JP] Japan .................................. 62-77112
Apr. 1, 1987 [JP] Japan .................................. 62-79943

[51] Int. Cl.$^4$ ........................... H01G 9/05; B01J 17/00
[52] U.S. Cl. ..................................... 361/525; 29/570.1
[58] Field of Search ........................ 29/570.1, 569 R; 427/80; 361/328–330, 433

[56] References Cited

U.S. PATENT DOCUMENTS

| | | | |
|---|---|---|---|
| 2,387,759 | 10/1945 | Jarvis | 361/323 X |
| 2,647,079 | 7/1953 | Burnham | 361/433 |
| 3,375,413 | 3/1968 | Brill | 29/570.1 |
| 3,553,544 | 1/9171 | Puppolo et al. | 361/433 |
| 3,679,944 | 7/1972 | Yoshimura et al. | 29/570.1 X |
| 3,697,822 | 10/1972 | Alwitt | 361/433 |
| 3,745,508 | 7/1973 | Bruder et al. | 361/330 X |
| 3,781,976 | 1/1974 | Tomiwa | 29/570.1 |
| 4,009,424 | 2/1977 | Itoh | 361/433 |
| 4,039,904 | 8/1977 | Klein | 361/433 |
| 4,494,299 | 1/1985 | Franklin et al. | 29/570.1 |

FOREIGN PATENT DOCUMENTS 2305838 10/1976 France .................................. 29/570.1
76357 7/1978 Japan .................................. 29/570.1

Primary Examiner—Donald A. Griffin
Attorney, Agent, or Firm—Armstrong, Nikaido, Marmelstein & Kubovcik

[57] ABSTRACT

A solid electrolytic capacitor has a capacitor element including a metal plate, such as a plate of aluminum, tantalum, niobium or titanium, capable of having a dielectric oxidation layer formed thereon, a resist layer of a desired shape formed on a predetermined portion of the metal plate, a dielectric oxidation layer formed on a surface of the metal plate at one portion thereof defined by the resist layer, a polymer layer of a heterocyclic compound such as pyrrole, furan or thiophene formed on the dielectric oxidation layer, a conductive layer formed on the polymer layer, a first terminal attached to another portion of the metal plate defined by the resist layer, and a second terminal attached to the conductive layer. In an embodiment, a plurality of the metal plates are stacked to obtain a capacitor element having a multi-layered structure. In another embodiment, the polymer layer and conductive layer are formed successively to obtain an array-type solid electrolytic capacitor element comprising a single metal plate. In a further embodiment, the polymer layer and conductive layer are formed successively to obtain an array-type solid electrolytic capacitor element comprising stacked metal plates.

37 Claims, 17 Drawing Sheets

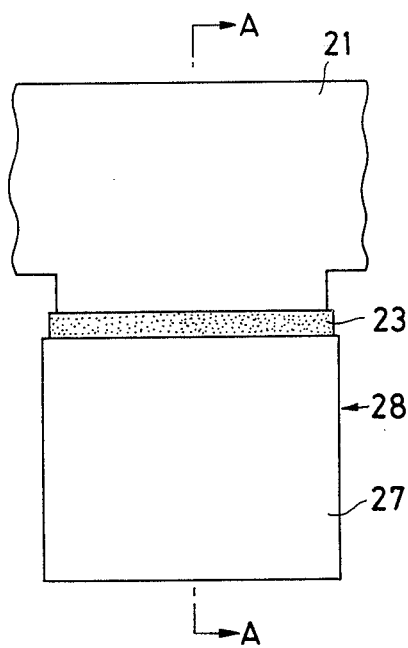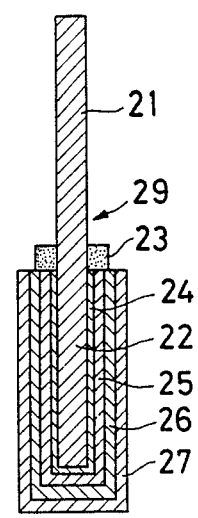
FIG. 8(A)  FIG. 8(B)
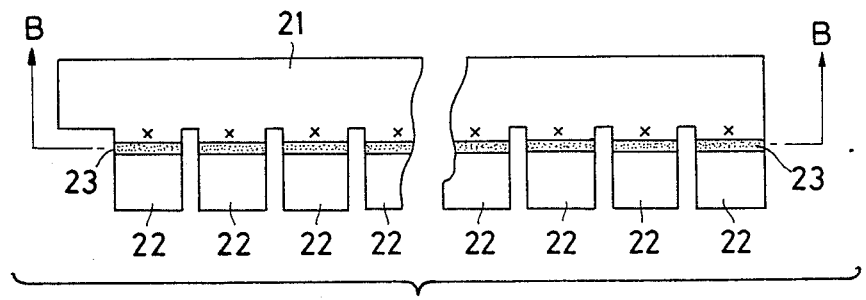
Fig.9

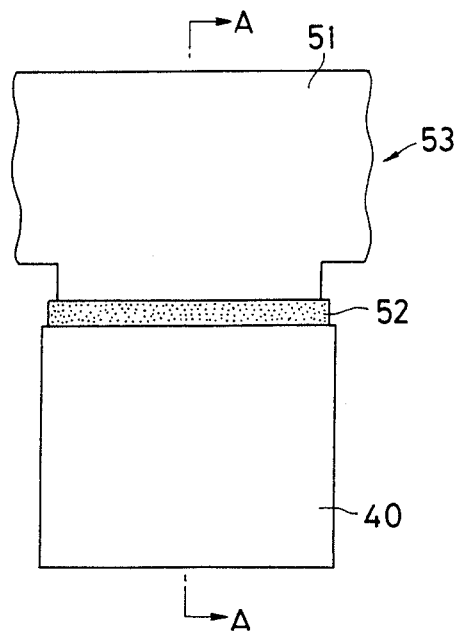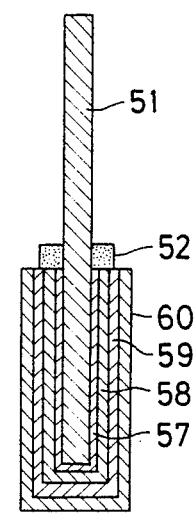
FIG. 30(A)  FIG. 30(B)
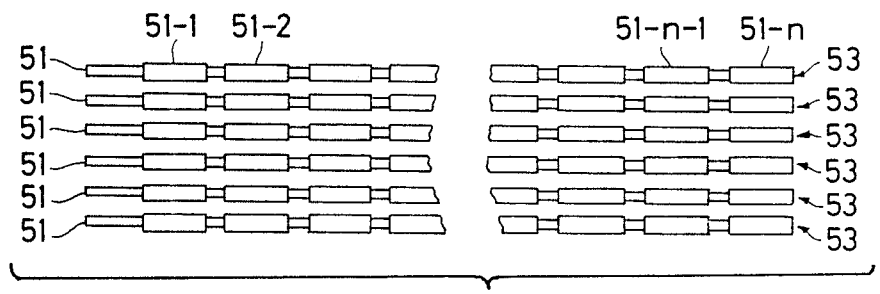
Fig. 31

| | CAPACITANCE ($\mu F$) | tan$\delta$ (%) 1 KHZ | LEAKAGE CURRENT |
|---|---|---|---|
| PRESENT EMBODIMENT | 1×4 UNITS | 1.2 | LESS THAN 0.01($\mu F$) |
| CERAMIC ARRAY-TYPE CAPACITOR | 0.5×4 UNITS | 0.5 | LESS THAN 0.01($\mu F$) |

SOLID ELECTROLYTIC CAPACITOR, AND METHOD OF MANUFACTURING SAME

BACKGROUND OF THE INVENTION

This invention relates to a solid electrolytic capacitor using an organic semiconductor as an electrolyte. More particularly, the invention relates to a solid electrolytic capacitor in which a polymer of a heterocyclic compound such as pyrrole, furan or thiophene is used as a solid electrolyte, and to a method of manufacturing this capacitor.

Conventionally, solid electrolytic capacitors use manganese dioxide ($MnO_2$) as a solid electrolyte or an organic semiconductor such as 7,7,8,8-tetracyanoquinodimethane (TCNQ) salt as the solid electrolyte.

A solid electrolytic capacitor in which manganese dioxide ($MnO_2$) is used as the solid electrolyte has a capacitor element obtained by forming a thin dielectric oxidation layer such as aluminum oxide ($Al_2O_3$) on the surface of a metal such as aluminum on which the dielectric oxidation layer is capable of being formed, forming a manganese dioxide layer ($MnO_2$) on the thin dielectric oxidation layer, forming a graphite layer on the manganese dioxide layer, forming a silver paste layer on the graphite layer, using the metal as one electrode and using the silver paste layer as the other electrode.

A solid electrolytic capacitor in which an organic semiconductor such as 7,7,8,8-tetracyanoquinodimethane (TCNQ) salt is used as the solid electrolyte has a capacitor element obtained by forming a thin dielectric oxidation layer such as aluminum oxide ($Al_2O_3$) on the surface of a metal foil such as aluminum, overlapping an electrolyte paper and the metal foil and winding them into a coil, and impregnating the electrolyte paper with an organic semiconductor such as 7,7,8,8-tetracyanoquinodimethane (TCNQ) salt or the like.

However, the solid electrolytic capacitor using manganese dioxide ($MnO_2$) as the solid electrolyte is disadvantageous in that the process for forming the manganese dioxide ($MnO_2$) layer on the thin film oxide of a metal is extremely complicated and costly. Another problem is that when the manganese dioxide ($MnO_2$) layer is formed by the thermal decomposition of manganese nitrate, the oxide thin film is damaged. Though this can be repaired by reformation, the restorability of the oxide film is poor owing to the manganese dioxide ($MnO_2$) layer. Moreover, since the conductivity of the manganese dioxide ($MnO_2$) is low, the specific resistance or ESR of the solid electrolytic capacitor is large and the leakage current is high.

The solid electrolytic capacitor using an organic semiconductor such as 7,7,8,8-tetracyanoquino-dimethane (TCNQ) salt as the solid electrolyte is disadvantageous in that when the TCNQ salt is held in the heated and molten state, an insulating reaction takes place in a very short period of time (about 10 sec) and, when the salt cools and hardens, it is converted from a semiconductor to an insulator. Other problems are that the manufacturing process is difficult to manage and does not readily lend itself to mass production. In addition, the TCNQ salt is high in price and raises costs. A further drawback is that the specific resistance is high, though not to the extent of the solid electrolytic capacitor using manganese dioxide ($MnO_2$) as the solid electrolyte.

Array-type electrolytic capacitors are also available. Conventional electrolytic capacitors of this type include thin-film array-type electrolytic capacitors, thick-film array-type electrolytic capacitors and sintered-type array chips. However, all of these capacitors have certain drawbacks, which will now be described.

The thin-film array-type electrolytic capacitors have a low rated capacitance in the range 100 pF–10,000 pF.

Though the thick-film array-type electrolytic capacitor has a higher capacitance of several microfarads, it is very difficult to manufacture owing to the fact that the desired anode circuit pattern is formed on an insulator substrate by photolithography or a masking process. At the same time, process control for forming a manganese dioxide thin film on the anode circuit pattern is very complicated and difficult to perform. If manganese dioxide is used as the electrolyte, moreover, the capacitor exhibits a higher specific resistance or ESR.

The sintered-type array chip generally has a low capacitance. Increasing the capacitance necessitates an array chip of larger dimensions.

SUMMARY OF THE INVENTION

The present invention has been devised in view of the foregoing circumstances and its object is to provide a solid electrolytic capacitor, as well as a method of manufacturing the same, using a polymer layer of a heterocyclic compound as a solid electrolyte, whereby specific resistance and leakage current are reduced, manufacture is simplified and suited to mass production and disparities in characteristics are eliminated.

Another object of the invention is to provide a solid electrolytic capacitor, as well as a method of manufacturing the same, using a polymer layer of a heterocyclic compound as a solid electrolyte and adopting a multi-layered structure for the capacitor element, thereby affording a miniaturizable capacitor suited to mass production and having excellent high-frequency characteristics and a high capacitance.

A further object of the invention is to provide a solid electrolytic capacitor using a polymer layer of a heterocyclic compound as a solid electrolyte and adopting an array-type structure for the capacitor element.

The solid electrolytic capacitor in accordance with the present invention is characterized by having a capacitor element comprising: a metal plate, such as an aluminum plate, tantalum plate, niobium plate or titanium plate, capable of having a dielectric oxidation layer formed thereon; a resist layer of a desired shape formed on a predetermined portion of the metal plate; a dielectric oxidation layer formed on a surface of the metal plate at one portion thereof defined by the resist layer; a polymer layer of a heterocyclic compound such as pyrrole, furan or thiophene formed on the dielectric oxidation layer; a conductive layer formed on the polymer layer; a first terminal attached to another portion of the metal plate defined by the resist layer; and a second terminal attached to the conductive layer.

In another aspect of the invention, there is provided a solid electrolytic capacitor, as well as a method of manufacturing the same, in which a capacitor element is provided with a multi-layered structure by stacking a plurality of the aforementioned metal plates each having the dielectric oxidation layer, the polymer of the heterocyclic compound and the conductive layer formed successively thereon.

In a further aspect of the invention, there is provided a solid electrolytic capacitor having an array-type solid electrolytic capacitor element comprising: a metal plate capable of having a dielectric oxidation layer formed thereon; a resist layer formed on the metal plate; a plurality of metal exposing surfaces defined on the metal plate by the resist layer, each metal exposing surface being continuous from an obverse to a reverse side of the metal plate; a dielectric oxidation layer formed on all but at least one of the plurality of metal exposing surfaces; a polymer layer of a heterocyclic compound formed on the dielectric oxidation layer; a conductive layer formed on the polymer layer; a first terminal provided on the at least one of the metal exposing surfaces not having the dielectric oxidation layer formed thereon; and second terminals provided on the conductive layer formed on respective ones of the metal exposing surfaces.

In yet another aspect of the invention, there is provided a solid electrolytic capacitor having a multi-layered array-type solid electrolytic capacitor element comprising: a metal plate formed to include a plurality of projections of a predetermined shape on at least one side edge thereof, the metal plate capable of having a dielectric oxidation layer formed thereon; a resist layer formed on a predetermined portion of each of the projections; a dielectric oxidation layer formed on the surface of a tip end of each of the projections defined by the resist layer; a polymer layer of a heterocyclic compound formed on the dielectric oxidation layer; a conductive layer formed on the polymer layer; a plurality of the metal plates being stacked in such a manner that the projections thereof are made to correspond to one another, the stacked plates being integrated by application of presssure thereto; a first terminal provided on the stacked metal plates; and a second terminal provided on the conductive layers formed on the tip ends of the projections defined by the plural resist layers on the projections.

In still another aspect of the invention, there is provided a solid electrolytic capacitor having an array-type solid electrolytic capacitor element comprising: a metal plate capable of having a dielectric oxidation layer formed thereon; a resist layer formed on the metal plate; a plurality of metal exposing surfaces defined on the metal plate by the resist layer, each metal exposing surface having the same shape and being continuous from an obverse to a reverse side of the metal plate; a dielectric oxidation layer formed on all but at least one of the plurality of metal exposing surfaces; a polymer layer of a heterocyclic compound formed on the dielectric oxidation layer; a conductive layer formed on the polymer layer; a plurality of the metal plates being stacked in such a manner that the conductive layers thereof are made to correspond to one another, the stacked plates being integrated by application of pressure thereto; a first terminal provided on the at least one of the metal exposing surfaces of the stacked metal plates not having the dielectric oxidation layer formed thereon; and second terminals provided on the surface of the conductive layers, or provided between these conductive layers, formed on respective ones of the metal exposing surfaces of the stacked metal plates.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 illustrates a capacitor element plate constituting a solid electrolytic capacitor of a second embodiment according to the invention, in which (A) is an enlarged plan view of a portion thereof, and (B) is a sectional view taken along line A—A of (A);

FIG. 9 is a plan view, partially cut away, illustrating an etched aluminum foil constituting a capacitor element substrate;

FIG. 30(A) is an enlarged plan view showing a portion of an array-type solid electrolytic capacitor element, and FIG. 30(B) is a sectional view taken along line A—A of FIG. 30(A);

FIG. 31 is a front view illustrating a case where six array-type solid electrolytic capacitor element plates are stacked;

DESCRIPTION OF THE PREFERRED EMBODIMENT

Figure 1:
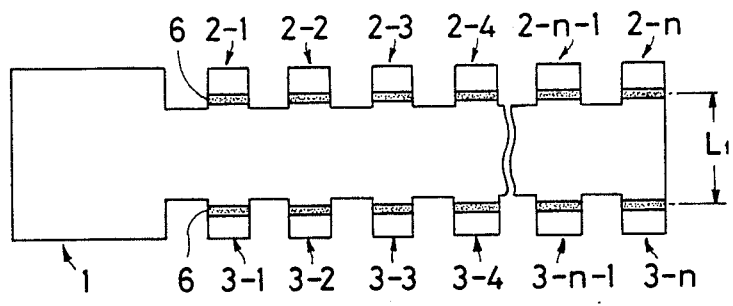
FIG. 1 is a view illustrating the shape of a metal plate serving as the substrate of a capacitor element of a solid electrolytic capacitor according to the present invention.

FIG. 1 is a view illustrating the shape of a metal plate, on which a dielectric oxidation layer is capable of being formed, serving as the substrate of a capacitor element of a solid electrolytic capacitor according to the present invention.

In FIG. 1, numeral 1 denotes a metal plate. In the present embodiment, the surface of an aluminum foil is subjected to an etching treatment to roughen the surface, after which the foil is cut into the shape shown in FIG. 1. Specifically, the foil is cut into a shape having a number of rectangular projections 2-1, 2-2, . . . 2-n along one longitudinal edge and a number of rectangular projections 3-1, 3-2, . . . 3-n along the other longitudinal edge. Next, a resist layer 6 comprising an insulative material is formed on the peripheral surface of each of the projections 2-1, 2-2, . . . 2-n and 3-1, 3-2, . . . 3-n at a predetermined position thereon.

Figure 2:
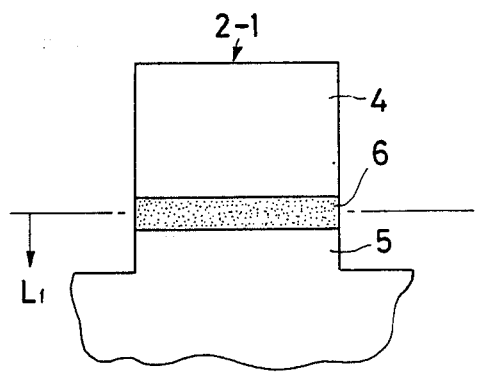
FIG. 2 is an enlarged view showing a portion of a projection on the metal plate of FIG. 1.

FIG. 2 is an enlarged view of a portion of the projection 2-1. As shown in FIG. 2, the resist layer 6 having a predetermined shape and size is formed on the peripheral surface of the projection 2-1 at a predetermined position thereon, whereby the projection 2-1 is divided into two portions 4 and 5. The portion 4 constitutes an exposed surface of the metal plate 1. The top side and underside of the exposed surface are continuous. The resist layer 6 is similarly formed on the other projections 2-2, . . . 2-n and 3-1, 3-2, . . . 3-n.

Figure 3:
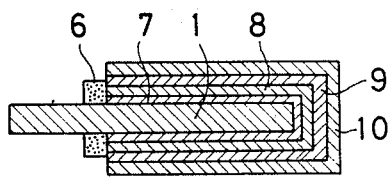
FIG. 3 is a view showing the cross-sectional structure of the capacitor.

Masking is applied to the $L_1$ section of the aluminum foil having the resist layer 6 formed at the predetermined positions of the projections 2-1, 2-2, . . . 2-n, 3-1, 3-2, . . . 3-n. Thereafter, as shown in the sectional view of FIG. 3, a thin-film aluminum oxide ($Al_2O_3$) layer 7, a polymer layer 8 of a heterocyclic compound, a graphite layer 9 and a silver paste layer 10 are successively formed on the portion 4 defined on each of the projections 2-1, 2-2, . . . 2-n, 3-1, 3-2, . . . 3-n by the resist layer 6.

The thin-film aluminum oxide ($Al_2O_3$) layer 7 is formed by an ordinary formation process.

After the aluminum oxide ($Al_2O_3$) layer 7 is formed on the portion 4 defined by the resist layer 6 and the $L_1$ section of the aluminum foil is masked, the polymer layer 8 of the heterocyclic compound is formed by dipping the foil in an electrolyte solution containing pyrrole and either borodisalicyclic acid or borodisalicylate salt (e.g. an electrolyte solution containing pyrrole and ammonium borodisalicylate (ABS)) and in which acetonitrile is the solvent, adopting the vessel containing the electrolyte solution as the cathode and the aluminum foil as the anode, and supplying a predetermined direct current thereto.

As a result, electrochemical polymerization takes place in the electrolyte solution so that a polypyrrole layer is formed on the thin-film aluminum oxide layer 7. The thickness of the polypyrrole layer is 20–50 μm.

In the present embodiment, ABS is used in forming the polypyrrole layer. However, since the pyrrole polymer layer or polypyrrole layer formed by electrochemical polymerization on the dielectric oxidation layer such as the aluminum oxide layer 7 is a polypyrrole compound in which the N-H groups of the pyrrole molecules and the supporting electrolyte are hydrogen bonded, the electrolytic polymerization should be carried out in an electrolyte solution which includes pyrrole and the supporting electrolyte. Use should be made of a supporting electrolyte containing boric acid and any one of the following ingredients:

(1) an aliphatic acid, aromatic carboxylic acid or salt thereof;

(2) an aliphatic or aromatic compound, or salt thereof, having two or more carbonyl groups;

(3) an aliphatic or aromatic organic compound, or salt thereof, having at least one hydroxyl (—OH) group and at least one carboxylic acid (—COOH) group; and (4) an aliphatic or aromatic organic compound, or salt thereof, having at least one amine (—NH$_2$) group and at least one carboxylic acid (—COOH) group.

It is of course possible to use a boron compound obtained by chemically combining boric acid and the abovementioned (1) through (4) as the supporting electrolyte.

To form the graphite layer 9 and silver paste layer 10 on the pyrrole polymer layer, the portion having the polypyrrole layer formed thereon is dipped into a graphite solution, after which the graphite on the polypyrrole layer is allowed to harden to form the graphite layer 9. The resulting structure is then dipped into a silver paste solution to coat the graphite layer 9 with the silver paste. This is then allowed to harden to form the silver paste layer 10.

After the aluminum oxide ($Al_2O_3$) layer 7, the polymer layer 8 of the heterocyclic compound, the graphite layer 9 and the silver paste layer 10 are successively formed on each portion 4 defined by the resist layer 6 on the projections 2-1, 2-2, . . . 2-n and 3-1, 3-2, . . . 3-n, these projections 2-1, 2-2, . . . 2-n and 3-1, 3-2, . . . 3-n are cut off at their base ends from the metal plate 1.

Figure 4:
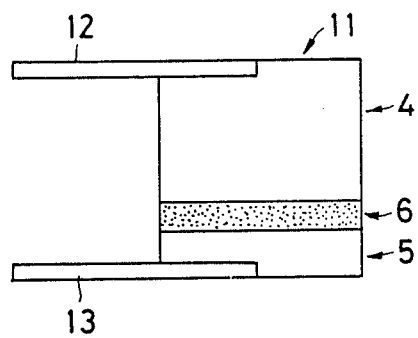
FIG. 4 is a view showing the shape of a capacitor element of a solid electrolytic capacitor according to the present invention.

As shown in FIG. 4, each projection cut off from the plate 1 has the portion 4 on one side of the resist layer 6 and an uncoated portion 5 on the other side of the resist layer. A lead terminal 12 is connected to the portion 4, and a lead terminal 13 is connected to the portion 5. This completes the manufacture of a capacitor element 11 constituting a solid electrolytic capacitor according to the present invention.

If the capacitor element 11 is to be sheathed, a cladding or housing such as of resin is applied to the entirety of the capacitor element 11 with the exception of the portions of the lead terminals 12, 13 that protrude from the element 11 proper. This will complete the solid electrolytic capacitor of the invention.

Figure 5:
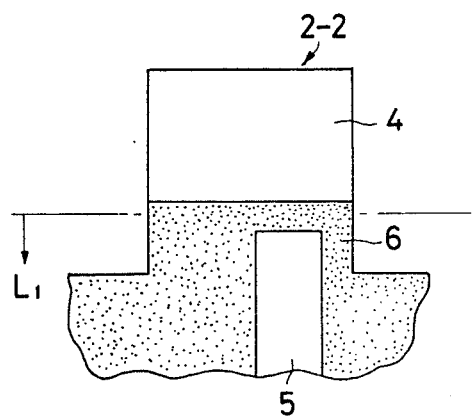
FIG. 5 is an enlarged view showing a portion of a projection of another metal plate.

FIG. 5 is a view showing another shape of the resist layer formed on the projections 2-1, 2-1, ... 2-n and 3-1, 3-2, ... 3-n on both longitudinal sides of the etched aluminum foil constituting the metal plate 1. FIG. 5 is an enlarged view of the projection 2-2.

As shown in FIG. 5, the resist layer is formed over the entire surface of the etched aluminum foil leaving exposed the predetermined portion 4 of the projection and the portion 5 to which one of the capacitor terminals is attached.

Figure 6:
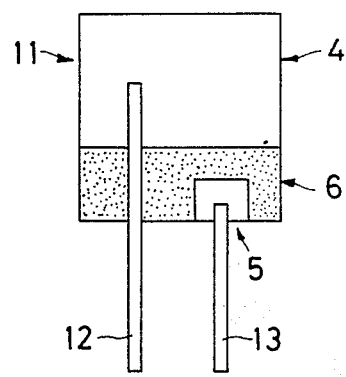
FIG. 6 is a view showing the shape of another capacitor element of an solid electrolytic capacitor according to the present invention.

Next, in the manner set forth above, the thin-film aluminum oxide ($Al_2O_3$) 7, the polymer layer 8 of the heterocyclic compound, the graphite layer 9 and the silver paste 10 are formed successively on the portion 4 defined by the resist layer 6. Thereafter, the projections 2-1, 2-2, ... 2-n and 3-1, 3-2, ... 3-n are cut off from the etched aluminum foil. Then, as shown in FIG. 6, the terminal 12 is connected to the portion 4 and the terminal 13 is connected to the portion 5. This completes the manufacture of the capacitor element 11.

If the capacitor element 11 is to be sheathed, a cladding is applied to the capacitor element 11 with the exception of the portions of the lead terminals 12, 13 that protrude from the element 11 proper, just as described above. This will complete the solid electrolytic capacitor of the invention.

The spacing between the lead terminals 12 and 13 and the directions in which these lead terminals are extracted from the capcitor element can be freely adjusted by thus forming the resist layer 6 in various shapes and dimensions on the projections 2-1, 2-2, ... 2-n and 3-1, 3-2, ... 3-n at predetermined positions.

In the example described above, the capacitor 11 is manufactured by successively forming the aluminum oxide ($Al_2O_3$) layer 7, the polymer layer 8 of the heterocyclic compound, the graphite layer 9 and the silver paste layer 10 on each portion 4 defined by the resist layer 6 on the etched aluminum foil, thereafter severing the projections 2-1, 2-2, ... 2-n and 3-1, 3-2, ... 3-n from the etched aluminum foil, and connecting the terminals 12 and 13 to the respective portion 4 and 5 defined by the resist layer 6. However, the manufacturing process is not so limited. For example, it is permissible to severe the projections 2-1, 2-2, ... 2-n and 3-1, 3-2, ... 3-n from the etched aluminum foil after the lead terminals 12 and 13 are attached.

Thus, the point is that the steps of the manufacturing process can have any order so long as the capacitor element is manufactured by at least the following means:

means for forming a resist layer of a desired shape on a predetermined portion of a projection on a metal plate;
means for successively forming a dielectric oxidation layer, a polymer layer of a heterocyclic compound and a conductive layer on a surface of one portion of the projection defined by the resist layer;
means for severing the projection from a base portion; and
means for attaching a first lead terminal to another portion of the severed projection defined by the resist layer and a second lead terminal to the conductive layer.

The lead terminals 12 and 13 illustrated above serve as as example only, and the terminal structure is not limited thereto.

By constructing the solid electrolytic capacitor as described hereinabove, the polymer layer 8 of the heterocyclic compound is made to serve as an electrolyte. Therefore, since the polymer layer 8 has a high conductivity, the solid electrolytic capacitor has a specific resistance or ESR which is lower than the conventional solid electrolytic capacitor in which the solid electrolyte is manganese dioxide ($MnO_2$) or an organic semiconductor such as 7,7,8,8-tetracyanoquinodimethane (TCNQ) salt. In addition, leakage current is much less in comparison with the conventional solid electrolytic capacitor. Thus, the solid electrolytic capacitor of the present invention has outstanding characteristics.

The above-described solid electrolytic capacitor is characterized by non-polarity. In other words, the capacitor will not exhibit polarity when supplied with a voltage within a fixed range. Thus, if a voltage within a fixed range is impressed upon the capacitor 11 described above, either the lead terminal 12 or 13 may serves as the anode. Conversely, either may serve as the cathode.

Figure 7:
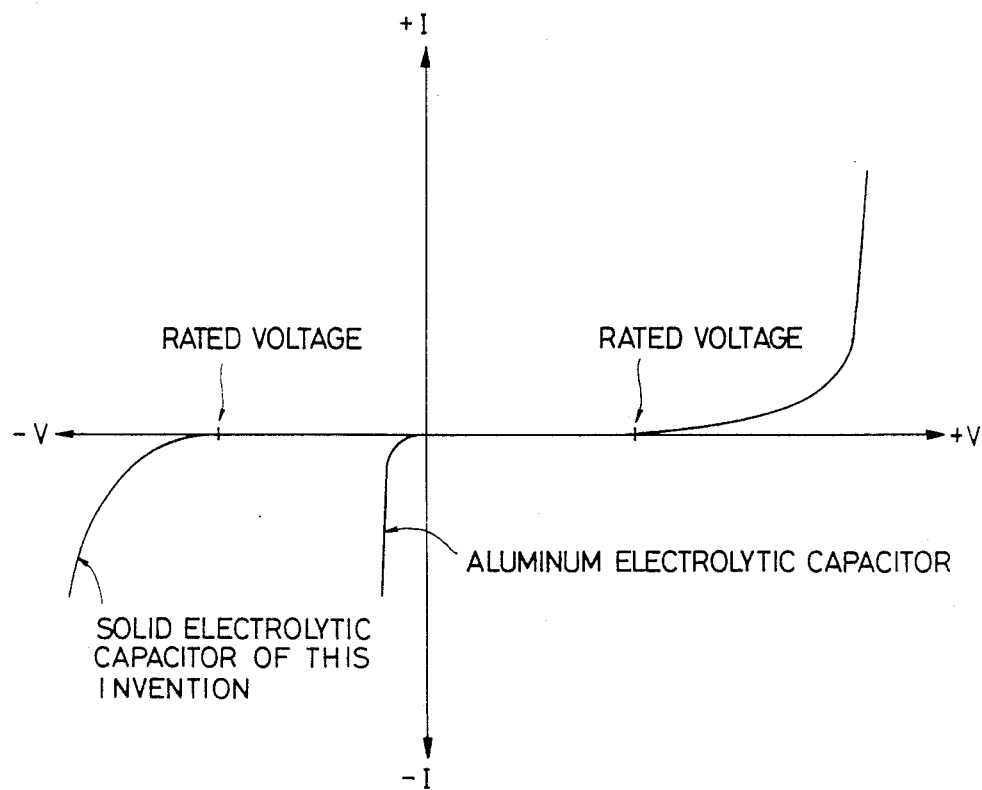
FIG. 7 is a view showing leakage current-voltage characteristics of a solid electrolytic capacitor according to a first embodiment and of an aluminum electrolytic capacitor according to the prior art.

FIG. 7 is a view showing leakage current—voltage characteristics of a solid electrolytic capacitor according to the present embodiment and of an aluminum electrolytic capacitor according to the prior art.

In FIG. 7, leakage current I is plotted along the vertical axis and voltage V is plotted along the horizontal axis. As shown in FIG. 7, it has been confirmed by experiment that with the conventional aluminum electrolytic capacitor, leakage current I increases sharply when a voltage of negative polarity is impressed upon the capacitor, and the capacitor is eventually destroyed. With the solid electrolytic capacitor of the present embodiment, however, the leakage current value is approximately the same as in the case of an applied positive voltage so long as the negative voltage applied to the capacitor has a value within the rated voltage range. In other words, it has been confirmed that the solid electrolytic capacitor of the invention exhibits nonpolarity in a predetermined voltage range.

By manufacturing the solid electrolytic capacitor of the invention in the manner set forth above, the thin-film aluminum oxide ($Al_2O_3$) layer 7, the polymer layer 8 of the heterocyclic compound, the graphite layer 9 and the silver paste layer 10 can be formed on the predetermined portions 4 of the multiplicity of projections 2-1, 2-2, ... 2-n and 3-1, 3-2, ... 3-n at one time. As a result, a large quantity of capacitor elements can readily be manufactured at one time.

Furthermore, since the graphite layer 9 and silver paste layer 10 can be formed by a dipping method, each of the layers can be formed quickly and uniformly. This makes it possible to reduce disparities in quality among the completed solid electrolytic capacitors.

In the above-described embodiment, an aluminum foil is used as the metal on which the dielectric oxidation layer is capable of being formed. However, the metal is not limited to aluminum. If the metal foil consists of a metal such as tantalum or niobium, a dielectric oxidation layer can be formed on the foil. It goes without saying, therefore, that even these metals can be employed.

Further, it has been described above that pyrrole is used as the heterocyclic compound. However, the heterocyclic compound is not limited to pyrrole, for a heterocyclic compound such as furan or thiophene can also be used.

In addition, the shape of the projections 2-1, 2-2, ... 2-n and 3-1, 3-2, ... 3-n formed on both longitudinal side edges of the etched aluminum foil I is not limited to a rectangle. It is obvious that the projections can be polygonal or cylindrical in shape.

Though the projections are formed on both longitudinal side edges of the etched aluminum film I in the foregoing embodiment, it is obvious that the projections may be formed on one side edge only.

FIGS. 8 and 9 are views illustrating the construction of a capacitor element constituting another solid electrolytic capacitor of the invention, in which FIG. 8(A) is an enlarged plan view of a portion thereof, and FIG. 8(B) is a sectional view taken along line A—A of FIG. 8(A). FIG. 9 is a plan view, partially cut away, illustrating the shape of a metal plate constituting a capacitor element substrate on which a dielectric oxidation layer is capable of being formed.

The metal plate serving as the substrate of the capacitor element can be any metal, such as aluminum, tantalum, titanium or niobium, on which a dielectric oxidation layer is capable of being formed. In the present embodiment, an etched aluminum foil 21 is used as the metal plate. The etched aluminum foil 21 has the form of a strip along one longitudinal side edge of which are formed a plurality of rectangular projections 22, 22, ... spaced apart a predetermined distance. A resist layer 23 of a predetermined shape and size is formed on the entire surface of each projection 22 at a predetermined position thereon. Thus, each projection 22 is divided into two portions by the resist layer 23.

As shown in FIG. 8(B), an aluminum oxide ($Al_2O_3$) layer 24 serving as a dielectric oxidation layer, a pyrrole polymer layer 25 serving as a polymer layer of a heterocyclic compound which forms an electrolyte, a graphite layer 26 and a silver paste layer 27, which together serve as a conductive layer for electrode extraction, are successively formed on the surface of a portion 28 defined by the resist layer 23.

The aluminum oxide ($Al_2O_3$) layer 24, pyrrole polymer layer 25, graphite layer 26 and silver paste layer 27 are formed in a manner which will now be described.

First, the etched aluminum foil 21 is masked on the portion thereof above the line B—B in FIG. 9, then the thin-film aluminum oxide ($Al_2O_3$) layer 24 is formed on the foil 21 through a well-known formation treatment.

Next, the pyrrole polymer layer 25 is formed by dipping the etched aluminum foil 21 in an electrolyte solution containing e.g. pyrrole and ammonium borodisalicylate (ABS) and in which acetonitrile is the solvent, the foil 21 having the aluminum oxide layer 24 formed on each portion 28 defined by the resist layer 23. This is followed by adopting the vessel (usually made of stainless steel) containing the electrolyte solution as the cathode and the etched aluminum foil 21 as the anode, and supplying a predetermined direct current thereto.

As a result, electrochemical polymerization takes place in the electrolyte solution so that a polypyrrole layer is formed on the thin-film aluminum oxide layer 7. The thickness of the polypyrrole layer is 20-50 μm.

In the present embodiment, ABS is used in forming the polypyrrole layer. However, since the pyrrole polymer layer or polypyrrole layer formed by electrochemical polymerization on the dielectric oxidation layer such as the aluminum oxide layer 12 is a polypyrrole compound in which the N-H groups of the pyrrole molecules and the supporting electrolyte are hydrogen bonded, the electrolytic polymerization should be carried out in an electrolyte solution which includes pyrrole and the supporting electrolyte. Use should be made of a supporting electrolyte containing boric acid and any one of the following ingredients:

(1) an aliphatic acid, aromatic carboxylic acid or salt thereof;
(2) an aliphatic or aromatic compound, or salt thereof, having two or more carbonyl groups;
(3) an aliphatic or aromatic organic compound, or salt thereof, having at least one hydroxyl (—OH) group and at least one carboxylic acid (—COOH) group; and
(4) an aliphatic or aromatic organic compound, or salt thereof, having at least one amine (—NH$_2$) group and at least one carboxylic acid (—COOH) group.

It is of course possible to use a boron compound obtained by chemically combining boric acid and the abovementioned (1) through (4) as the supporting electrolyte.

To form the graphite layer 26 and silver paste layer 27 on the thin-film pyrrole polymer layer 25, the portion of the etched aluminum foil 21 having the thin-film polypyrrole layer 25 formed thereon is dipped into a graphite solution, after which the graphite on the polypyrrole layer is allowed to harden to form the graphite layer 26. The resulting structure is then dipped into a silver paste solution to coat the graphite layer 26 with the silver paste. This is then allowed to harden to form the silver paste layer 27.

After the aluminum oxide ($Al_2O_3$) layer 24, the pyrrole polymer layer 25, the graphite layer 26 and the silver paste layer 27 are formed, the masking is removed. The result is a completed capacitor element plate 29 having the cross-sectional structure shown in FIG. 8(B).

Figure 10:
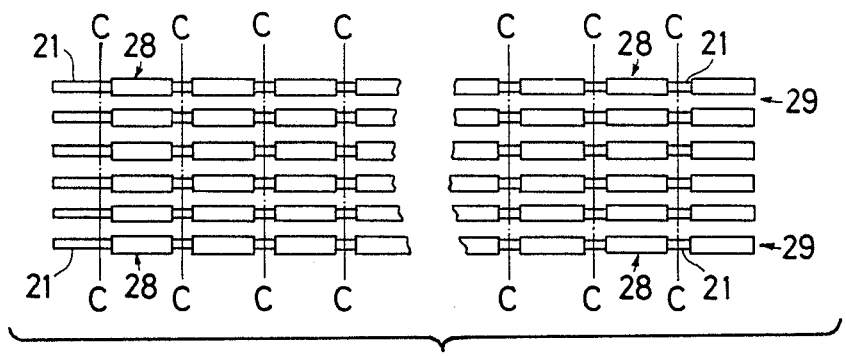
FIGS. 10 and 11 are views illustrating a process for manufacturing a multi-layered solid electrolytic capacitor according to the invention.
Figure 11:
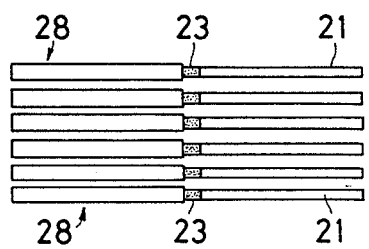

As shown in FIGS. 9 and 10, a plurality (six in the illustration) of the capacitor element plates 29 are stacked in such a manner that the projections 22 of the plates are made to correspond to one another. FIG. 10 is a front view showing the six capacitor element plates 29 in the stacked state, and FIG. 11 is a side view thereof.

Next, with the plurality of capacitor element plates 29 stacked closely together, the projections 22 are subjected to pressure at high temperatures and the silver paste layers 27 on the portions 28 defined by the respective resist layers 23 are allowed to partially dry, thereby integrating the capacitor element plates 29 by causing the portions 28 thereof to become affixed to one another. The other portions defined by the resist layers 23, namely the portions where the etched aluminum foil 21 is exposed (these portions being indicated by the "x" marks in FIG. 9), joined to one another as by being welded together.

Figure 12:
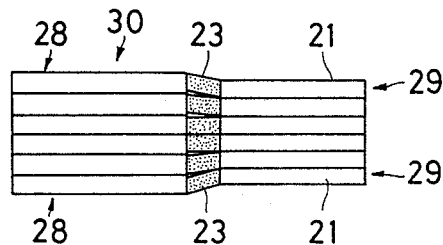
FIG. 12 is a view showing the main body of a multi-layered solid electrolytic capacitor element according to the invention.

Next, the stacked capacitor element plates 29 are severed between the projections 22 (along the lines C—C shown in FIG. 10), thereby completing a capacitor element body 30 of a multi-layered solid electrolytic capacitor having the configuration shown in FIG. 12.

In the above-described embodiment, the metal plate serving as the base of the capacitor element is the strip-shaped etched aluminum foil 21 having the plurality of spaced rectangular projections 22, 22 . . . formed along one longitudinal side edge of the strip. However, the shape of the metal plate serving as the base of the capacitor element is not limited to that described above. For example, as shown in FIG. 13, it is permissible to use a strip-shaped etched aluminum foil 21 having the plurality of rectangular projections 22, 22, . . . formed a predetermined distance apart on both longitudinal edges of the strip.

The point is that it will suffice if a plurality of the projections are formed on at least one longitudinal side edge of the metal plate. In addition, the shape of the projections is not limited to a rectangle. It is obvious that the projections can be polygonal or cylindrical in shape.

Figure 13:
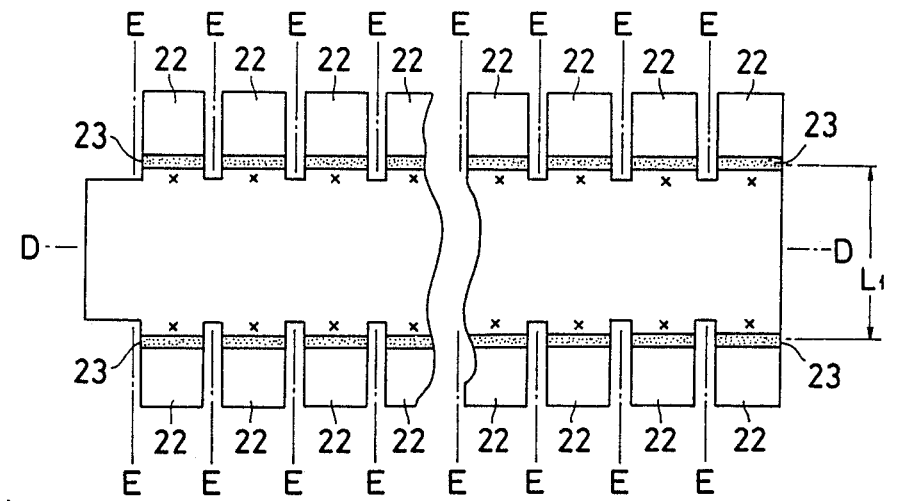
FIG. 13 is a plan view, partially cut away, illustrating another etched aluminum foil.

If the etched aluminum foil 21 having the shape shown in FIG. 13 is used, the resist layer is formed on the entire surface of the predetermined portion of each projection 22, after which the $L_1$ portion is masked and the aluminum oxide ($Al_2O_3$) layer 24, the pyrrole polymer layer 25, the graphite layer 26 and the silver paste layer 27 are successively formed on the portion of each projection defined by the resist layer 23, just as described above. The result is a capacitor element plate.

Thereafter, these capacitor element plates are stacked, subjected to pressure and the silver paste layers 27 are allowed to harden, thereby integrating the plates into a whole, with the etched aluminum foils 21 being joined together at the other portions defined by the resist layers 23. Thereafter, cutting is performed along the broken lines D—D, E—E shown in FIG. 13, whereby there are obtained capacitor element bodies 30 of a structure identical with that shown in FIG. 12.

Figure 14:
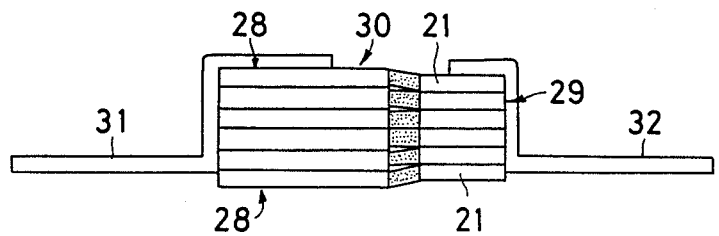
FIGS. 14 and 15 are views illustrating a process for manufacturing a chip-type multi-layered solid electrolytic capacitor according to the invention.

Next, as shown in FIG. 14, a plate-shaped terminal 31 is brought into pressured contact with the outer surface of the provisionally dried silver past layer 27 on the portion 28 of the capacitor element body 30 defined by the resist layer 23, and the silver paste layer 27 is then fully dried and cured to attach the terminal 31 to the portion 28. A similar plate-shaped terminal 32 is attached as by spot welding, ultrasonic welding or seamer welding to the etched aluminum foil 21 on the other portion defined by the resist layer 23. The finished product is the capacitor element.

Figure 15:
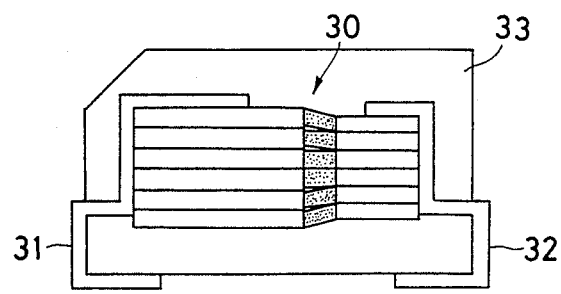

As shown in FIG. 15, a resin-molded housing or cladding 33 is formed on the capacitor element leaving portions of the terminals 31, 32 exposed. Thereafter, the exposed portions of the terminals 31, 32 are bent onto the outer surface of the resin-molded cladding 33 and the distal end portions of these terminals are extended onto the bottom surface of the cladding 33. This completes the fabrication of a chip-type multi-layered solid electrolytic capacitor.

Figure 16:
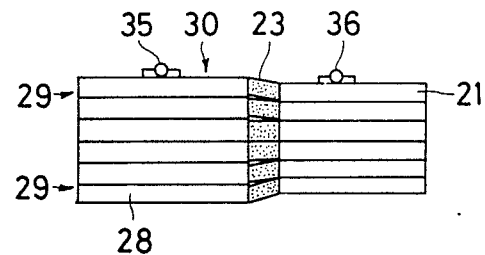
FIGS. 16 and 17 are a side view and top view, respectively, showing a lead terminal-type multi-layered solid electrolytic capacitor according to the invention.
Figure 17:
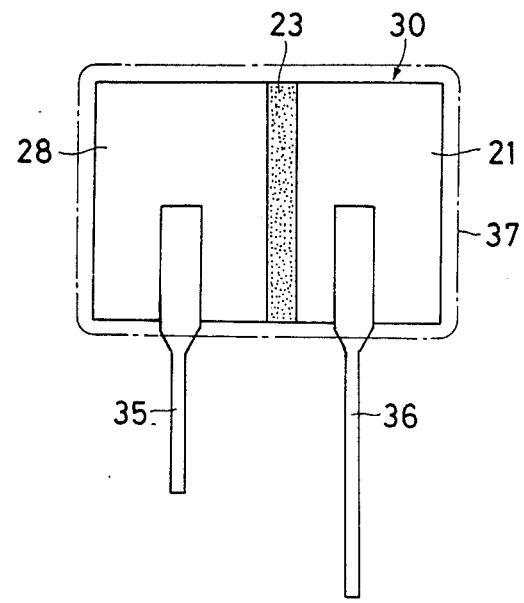

In the above embodiment, the capacitor element body 30 is of the chip type. However, as shown in FIGS. 16 and 17, it is possible to adopt a lead terminal-type multi-layered solid electrolytic capacitor by respectively attaching outwardly extending lead terminals 35 and 36, through the method described above, to the portion 28 defined on the capacitor element body 30 by the resist layer 23 and the etched aluminum foil 21 of the other portion defined by the resist layer 23, whereby a capacitor element is obtained, and forming a resin mold 37 on the capacitor element.

The capacitor element body 30 can be employed to produce a capacitor having a four-terminal structure. This will now be described.

Figure 18:
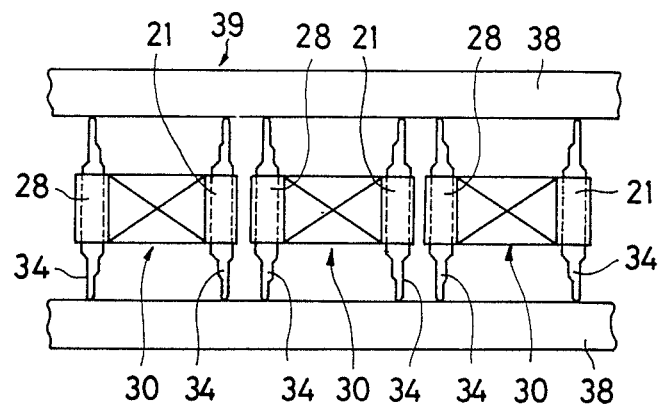
FIG. 18 is a view showing capacitor element bodies placed on a molding frame.
Figure 19:
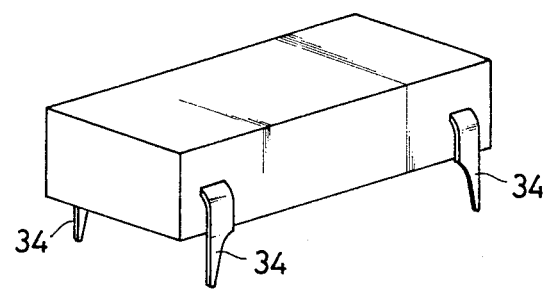
FIG. 19 is a view showing the external appearance of a four-terminal multi-layered solid electrolytic capacitor according to the invention.

As shown in FIG. 18, a molding frame 39 is prepared. The molding frame 30 comprises frames 38, 38 arranged in parallel, and a lead frame 34 formed integral with the frames 38, 38. Next, the capacitor element body 30 is arranged between the lead frames 34, 34 of the molding frame 39, the portion 28 of the capacitor element body 30 and one lead frame 34 are connected as by being soldered together, and the other portion of the capacitor element body, namely the etched aluminum foil 21, and one other lead frame 34 are joined as by spot welding, ultrasonic welding or seam welding. The entirety of the capacitor element body 30 is then molded in a synthetic resin leaving the distal ends of the lead frames 34 exposed. Finally, the distal ends of the lead frames 34 are severed from the frames 38, 38 and these are then bent, whereby there is obtained a miniature multi-layered solid electrolytic capacitor having a four-terminal structure, as shown in FIG. 19.

In the above embodiment, it is described that the capacitor element body 30 is obtained by forming the resist layer on a predetermined portion of each projection 22 of the etched aluminum foil 21, thus defining the portion 88, successively forming the aluminum oxide layer 24, the pyrrole polymer layer 25, the graphite layer 26 and the silver plaste layer 27 on each portion 28 to obtain the capacitor terminal plate 29, stacking a plurality of the capacitor element plates 29, applying pressure to the projections 22 and provisionally drying the silver paste layers 27 on the portions 28 defined by the resist layers 23, whereby the silver paste layers 27 are integrated by being affixed to one another, joining, as by welding, the portions of the etched aluminum foils 21 corresponding to the other portions defined by the resist layers 23, and thereafter severing the projections 22 at their base ends. However, the sequence of steps can be modified to some extent. For example, the silver paste layers 27 on the portions 28 can be provisionally dried to affix them together and hence integrate them, after which the projections can be cut off at their base ends, followed by joining, as by welding, the etched aluminum foils 21 corresponding to the other portions defined by the resist layers 23.

Thus, the point is that the steps of the manufacturing process can have any order so long as the capacitor element is manufactured by at least the following means:

means for forming the resist layer 23 on the projection 22;

means for successively forming the aluminum oxide layer 24, the pyrrole polymer layer 25, the graphite layer 26 and the silver paste layer 27 on one portion of the projection defined by the resist layer 23;

means for stacking a plurality of the etched aluminum foils 21 in such a manner that the one portions 28 defined on the foils by the resist layers 23 correspond and the other portions defined on the foils by the resist layers 23 correspond;

means for applying pressure to and integrating the silver paste layers 27 of the laminate;

means for joining, at each and every projection 22, the other portions of the etched aluminum foils 21 defined by the resist layers 23 of each projection 22 of the laminate;

means for cutting the laminate between the projections 22, 22 to form individual element laminates; and means for attaching a first terminal to a portion of the silver paste layers 27 of the element laminate and a second terminal to a portion of the etched aluminum foils 21 that have been joined together.

Figure 20:
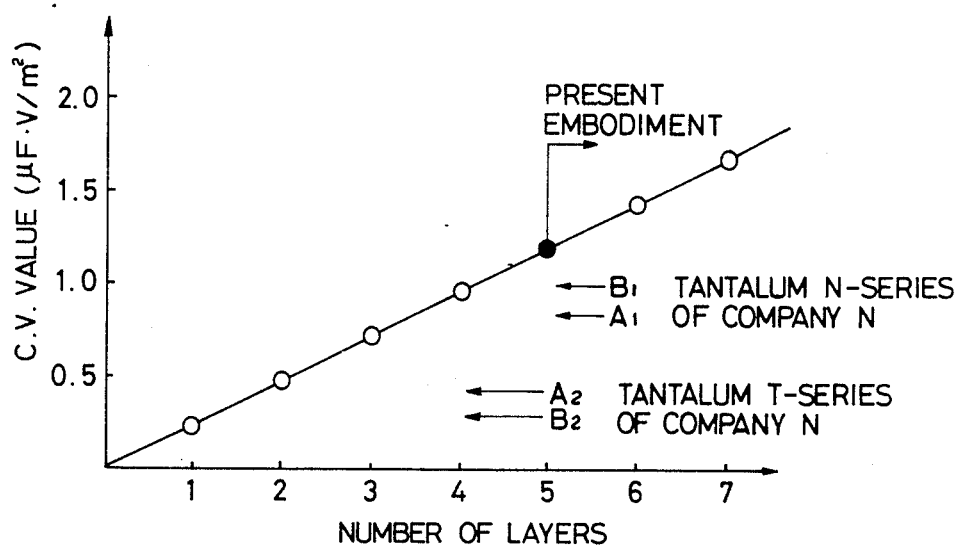
FIGS. 20 and 21 are views each showing the relationship between the number of layers and the CV value of a capacitor element plate in a conventional tantalum capacitor and in a multi-layered solid electrolytic capacitor according to the invention.
Figure 21:
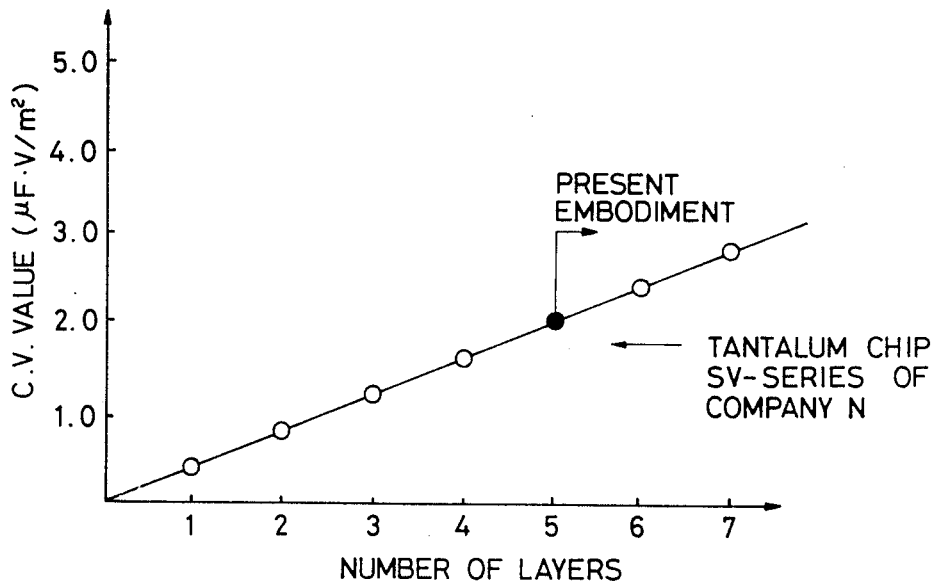

FIGS. 20 and 21 are views showing the relationship between the number of laminations and the CV value of a capacitor element plate in a conventional tantalum capacitor, said to have the largest CV value per unit volume, and in a multi-layered solid electrolytic capacitor according to the invention, respectively. CV value ($\mu$F·V/mm$^3$) is plotted along the vertical axis and the number of capacitor element plate laminations is plotted along the horizontal axis.

FIG. 20 shows a comparison between a tantalum solid mold of Company N and the present embodiment. $A_1$ and $B_1$ represent the CV values of products marketed as an N series by Company N, and $A_2$ and $B_2$ represent CV values of products marketed as a T series by Company N. As shown in FIG. 20, it has been experimentally verified that when the number of layers of the capacitor element plate 29 is made 25 or more, the present embodiment provides a larger CV value per unit volume.

FIG. 21 shows a comparison between a case-type tantalum chip of Company N and the present embodiment. This is a product marketed as an SV series. As shown in FIG. 21, it has been experimentally verified that when the number of layers of the capacitor element plate is made five or more, the present embodiment provides a larger CV value per unit volume.

Thus, as described above, when five or more of the capacitor element plates of the present embodiment are stacked, the CV value per unit volume attained is greater than that of the conventionally available tantalum capacitor said to have the largest CV value per unit volume.

Figure 22:
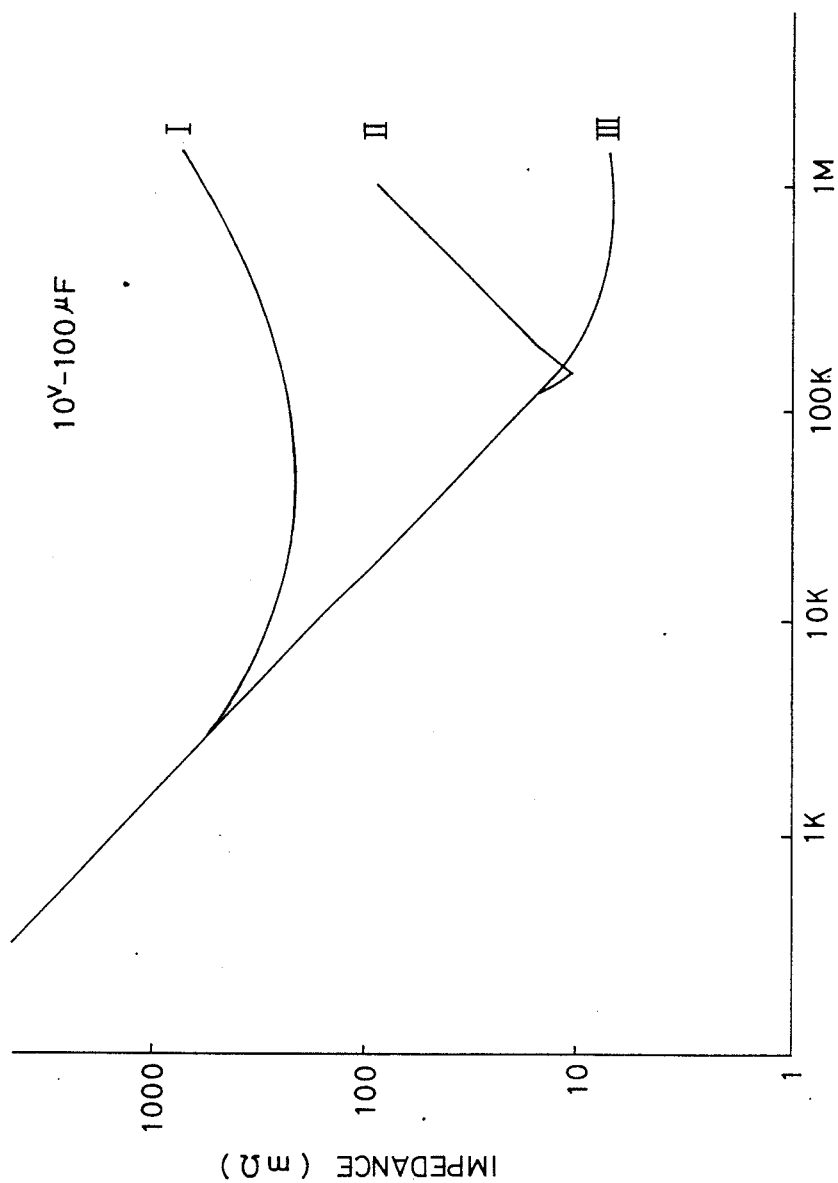
FIG. 22 is a view showing the frequency characteristics of the impedance of a solid electrolytic capacitor according to the invention and an aluminum electrolytic capacitor according to the prior art.

FIG. 22 is a view showing the frequency characteristics of the impedance of a solid electrolytic capacitor according to the foregoing embodiment and an aluminum electrolytic capacitor according to the prior art. Impedance values (m$\Omega$) are plotted along the vertical axis, and frequency (Hz) is plotted along the horizontal axis.

The curve I indicates the frequency characteristics of the impedance of a conventional aluminum electrolytic capacitor. The curve II indicates the frequency characteristics of the impedance of a four-terminal multi-layered solid electrolytic capacitor (see the structure shown in FIG. 19) obtained by using the capacitor element body 30 of the foregoing embodiment. The curve III indicates the frequency characteristics of the impedence of a multi-layered solid electrolytic capacitor having the structure wherein the lead terminals are attached to the capacitor element body 30 (see the structure shown in FIGS. 16 and 17.

As shown by the curves II and III, it has been verified that the multi-layered solid electrolytic capacitor of the foregoing embodiment has a very low impedance in a high-frequency region of more than 10 KHz.

It should be noted that the experimental results shown in FIG. 22 are for a multi-layered solid electrolytic capacitor and aluminum electrolytic capacitor each having a rated voltage of 10 V and a capacitance of 100 $\mu$F.

As described above, the multi-layered solid electrolytic capacitor of the present embodiment has a lower impedance in the high-frequency region than the conventional aluminum electrolytic capacitor. Moreover, by adopting the multi-layered structure for this solid electrolytic capacitor, miniaturization is possible. In particular, height can be reduced by adopting the four-terminal structure. Accordingly, the above-described multi-layered solid electrolytic capacitor is well suited as an output smoothing capacitor in an output smoothing circuit of a switching power supply and serves to reduce the size and thickness thereof.

Though pyrrole is used as the heterocyclic compound in the above-described embodiments, the heterocyclic compound is not limited thereto. For example, a heterocyclic compound such as furan or thiophene can be used. When the polymer layer of such a heterocyclic compound is made to serve as an electrolyte, the solid electrolytic capacitor has an equivalent series resistance or ESR which is lower than the conventional solid electrolytic capacitor in which the solid electrolyte is manganese dioxide (MnO2) or an organic semiconductor such as 7,7,8,8-tetracyanoquinodimethane (TCNQ) salt. In addition, leakage current is much less in comparison with the conventional solid electrolytic capacitor. Thus, the solid electrolytic capacitor of the present invention has outstanding characteristics.

The above-described solid electrolytic capacitor has voltage-current characteristics approximately the same as those shown in FIG. 7. In other words, the solid electrolytic capacitor of the present embodiment also has non-polar characteristics. Therefore, the capacitor does not exhibit polarity within a prescribed voltage range. Using the chip-type multi-layered solid electrolytic capacitor having the structure shown in FIG. 14 as an example, either the terminal 31 or 32 may serve as the anode. Conversely, either may serve as the cathode. In either case, almost the same leakage current-voltage characteristics are obtained.

In the above-described embodiment, an aluminum foil is used as the metal on which the dielectric oxidation layer is capable of being formed. However, the metal is not limited to aluminum. If the metal foil consists of a metal such as tantalum, titanium or niobium, a dielectric oxidation layer can be formed on the foil. It goes without saying, therefore, that even these metals can be employed.

Figure 23:
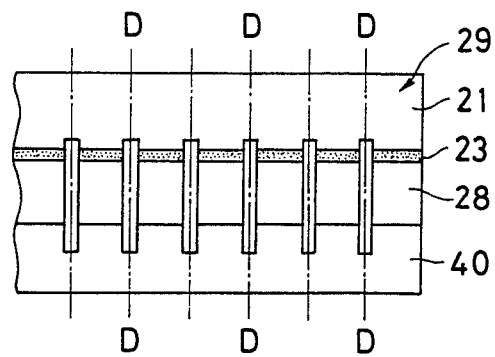
FIGS. 23 and 24 are views each illustrating a process for manufacturing another multi-layered solid electrolytic capacitor according to the invention.
Figure 24:
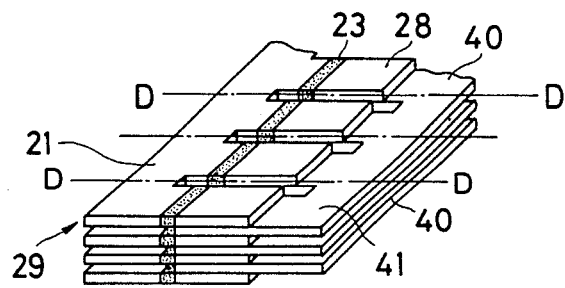

FIGS. 23 and 24 are views illustrating a process for manufacturing another multi-layered solid electrolytic capacitor according to the invention, in which FIG. 23 is a plan view and FIG. 24 a partial perspective view.

In FIGS. 23 and 24, the capacitor element plate 29 is the same as that shown in FIG. 8. Numeral 40 denotes a thin copper plate. The thin copper plate 40 has, on one longitudinal side edge thereof, projections 41 of a shape and dimensions corresponding to the portions 28 defined by the resist layers 23 of the capacitor element plate 29. When the capacitor element plates 29 are stacked, the projections 41 of the thin copper plates 40 are stacked by being interposed between the portions 28, 28. That is, the projections 41 of the thin copper plates 40 are interposed between the silver paste layers 27, 27 on the portions 28 defined by the resist layers 23, and the silver paste layers 27 and projections 41 of the thin copper plates 40 are combined and integrated by the application of pressure under high temperature.

After the portions 28, 28 of the capacitor element plates 29 are thus stacked and integrated with the projections 41 of the thin copper plates interposed therebetween, the leading edges of the thin aluminum plates 21 serving as one electrode of the capacitor element plates 29 and the leading edges of the thin copper plates 40 are joined as by spot welding, ultrasonic welding or seam welding.

Figure 25:
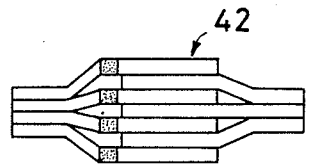
FIG. 25 is a view showing the main body of the multi-layered solid electrolytic capacitor element.

Next, the laminate is cut between the projections 22 (on lines D—D in FIGS. 23 and 24), thereby completing the fabrication of a capacitor element body 42 of the kind shown in FIG. 25.

Figure 26:
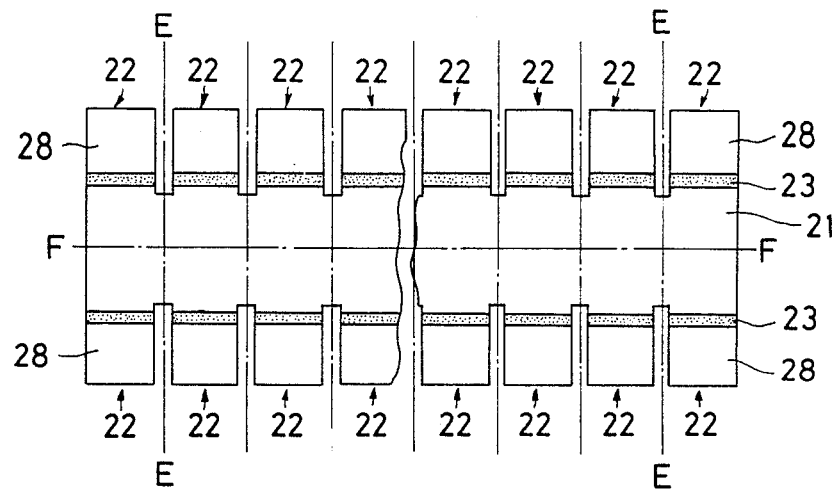
FIGS. 26 and 27 are views each illustrating another process for manufacturing another multi-layered solid electrolytic capacitor according to the invention.

In the above-described embodiment, the etched aluminum foil 21 having the projections 22 formed on one longitudinal edge thereof, as shown in FIG. 9, is used as the metal plate serving as the capacitor base and capable of having the dielectric oxidation layer formed thereon. However, a plurality of the projections 22 spaced a predetermined distance apart can be formed on both longitudinal side edges of a strip-shaped etched aluminum foil 21, as shown in FIG. 26, and this foil can be employed as the capacitor base.

Figure 27:
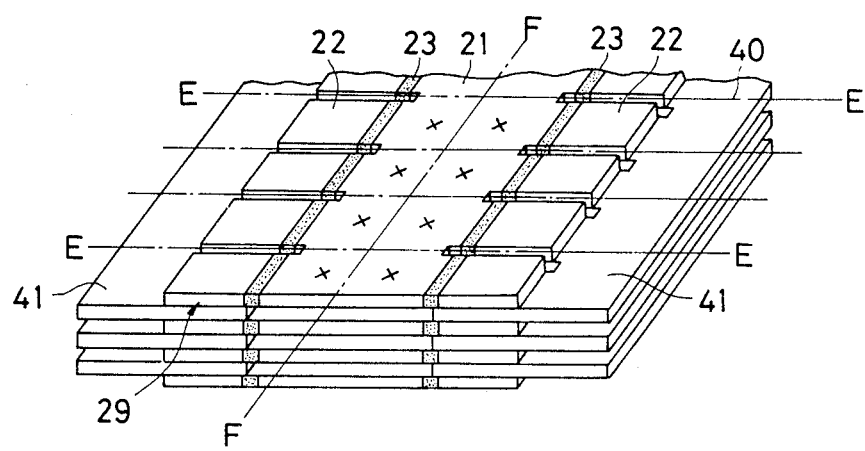

In such case, after the resist layer 23 is formed on the predetermined portions of the projections 22 and the aluminum oxide (Al$_2$O$_3$) 24, pyrrole polymer layer 25, graphite layer 26 and silver paste layer 27 are successively formed on the portions defined by the resist layer 23, as described hereinabove, the projections 22, 22 on both sides of the etched aluminum foils 21 are made to correspond to one another, as shown in FIG. 27, the thin copper plates 40 are interposed between silver paste layers 27, 27 formed on the portions 28 defined by the resist layers 23 of the projections 22, and pressure is applied under high temperature to integrate these portions.

Next, the leading edges on both sides of the thin copper plates 40 are joined as by being spot welded, ultrasonically welded or seam welded, and the etched aluminum foils 21 at the portions defined by the resist layers 23 (the portions opposite portions 28) (the portions indicated by the "x" marks in FIG. 27) are also joined. The resulting laminate is then cut between the projections 22, 22 and along the central portion of the etched aluminum foil 21 (i.e. along the lines E—E and F—F in FIGS. 26 and 27), thereby completing the fabrication of the capacitor element body 42 shown in FIG. 25.

The capacitor element body 42 can be employed to produce a capacitor having a four-terminal structure. Specifically, as shown in FIG. 18, a molding frame 39 is prepared. The molding frame 39 comprises frames 38, 38 arranged in parallel, and a lead frame 34 formed integral with the frames 38, 38. Next, the capacitor element body 42 is arranged between the lead frames 34, 34 of the molding frame 39. Next, the thin copper plate 40 of the capacitor element body 42 and one lead frame 34 are connected as by being soldered together, and the etched aluminum foil 21 and one other lead frame 34 are joined as by spot welding, ultrasonic welding or seam welding. The entirety of the capacitor element body 42 is then molded in a synthetic resin leaving the distal ends of the lead frames 34 exposed. Finally, the distal ends of the lead frames 34 are severed from the frames 38, 38 and these are then bent, whereby there is obtained a miniature multi-layered solid electrolytic capacitor having a four-terminal structure, as shown in FIG. 19.

In the above example, the capacitor element body 42 is illustrated as having a four-terminal structure. However, it is possible to adopt a lead terminal-type structure of the kind shown in FIGS. 9 and 10 by attaching lead terminals to the thin copper foil 40 of the capacitor element body 42 and to the etched aluminum foil 41. In such case, the capacitor can be housed in molded resin or the like if required.

If the capacitor is to have a chip-type structure, plate-shaped terminals are attached to the thin copper plate 40 and etched aluminum foil 21 of the capacitor element body 42, a cladding such as a molded resin is applied to the capacitor element body 42, and the terminals are bent along the bottom surface of the cladding from the outer side surfaces thereof, thereby providing a chip-type capacitor of the kind shown in FIG. 15.

The impedence characteristics of both the lead terminal-type and four-terminal type multi-layered solid electrolytic capacitor are almost the same as the characteristics indicated by the curves II and III of FIG. 22.

To fabricate the capacitor element in accordance with the foregoing embodiment, the capacitor element plates 29 are stacked with the thin copper plates 40 interposed therebetween, pressure is applied to integrally combine the thin copper plates 40 and etched aluminum foils 21, then the resulting laminate is cut at the predetermined portions to manufacture the capacitor element bodies 42 as discrete element laminates, and the terminals are attached to the thin copper plates 40 and etched aluminum foils 21 of the capacitor element body 42. However, the manufacturing sequence is not limited to the above. For example, after the capacitor element plates 29 are stacked with the thin copper plates 40 interposed therebetween and pressure is applied to integrate the plates, it is permissible to cut the resulting laminate at the predetermined portions to obtain the discrete element laminates, join the thin copper plates 40 of each laminate with one another, and join the etched aluminum foils 21 with one another, thereby manufacturing the capacitor element body 42.

Thus, the point is that the sequence of the manufacturing process can be modified somewhat so long as the capacitor element is manufactured by at least the following means:

means for forming the resist layer 23 on the predetermined portion of the projection 22 of the eteched aluminum foil 21 serving as the metal plate on which the dielectric oxidation layer is capable of being formed;

means for successively forming the aluminum oxide (Al$_2$O$_3$) layer 24, which serves as the dielectric oxidation layer, the pyrrole polymer layer 25, which serves as the polymer layer of the heterocyclic compound, the graphite layer 26 and silver paste layer 27, which constitute the conductive layer for electrode extraction, on one portion 28 of the projection defined by the resist layer 23;

means for stacking a plurality of the metal plates in such a manner that the projections 22 correspond with one another, with the thin copper plates 40 being interposed between the silver paste layers 27, 27 on the portions 28 defined by the resist layers 23;

means for applying pressure to and integating the porjections 22 of the resulting laminate;

means for joining the thin copper plates of the integrated laminate and as well as the etched aluminum foils 21;

means for cutting the laminate at predetermined portions to obtain individual element laminates; and means for attaching a first terminal to a portion of the thin copper plates 40 of the element laminate and a second terminal to a portion of the etched aluminum foils 21.

In the above-described embodiment, the etched aluminum foil 21 whose aluminum foil surface is roughened by an etching treatment is used as the metal plate serving as the base of the capacitor. However, it is obviously permissible to form an unetched aluminum foil as shown in FIG. 9 or 13, form the resist layer 23 on the predetermined portion of each projection 22, mask the foil leaving exposed the portion 28 defined by the resist layer 23, and etch the surface of the portion 28 to roughen the same.

When the plural capacitor element plates 29 of the above-described multi-layered solid electrolytic capacitor are stacked, the thin copper plates 40 are interposed between the portions 28, 28 defined by the resist layers 23, thereby improving the current withstanding characteristic. In other words, a rise in the temperature of the capacitor can be suppressed when a high-frequency current is applied thereto.

Further, the resist layer 23 is formed on a predetermined portion of each projection 22 of the strip-shaped etched aluminum foil 21 having the plurality of projections 22 formed at least on one longitudinal side edge thereof and spaced a predetermined distance apart, the aluminum oxide ($Al_2O_3$) layer 24, the pyrrole polymer layer 25, the graphite layer 26 and the silver paste layer 27 are formed successively on the portions 28 defined by the resist layer 23, thereby providing the capacitor element plate 29, a plurality of the capacitor element plates 29 are stacked with the thin copper plates 40 interposed therebetween, and predetermined portions are cut to manufacture the capacitor. Therefore, the multi-layered solid electrolytic capacitor of the invention is suited to mass production and the capacitors can be manufactured with uniform quality.

In addition, the capacitance of the multi-layered solid electrolytic capacitor can be decided at will by changing the number of the capacitor element plates 29 that are stacked.

Though it is described in the foregoing embodiment that pyrrole is used as the heterocyclic compound serving as the electrolyte, the heterocyclic compound is not limited to pyrrole, for furan or thiophene may also be employed.

Further, the above-described solid electrolytic capacitor also is characterized by non-polarity, having a leakage current-voltage characteristic of the kind shown in FIG. 7. In other words, the capacitor does not exhibit polarity in a prescribed voltage range.

Figure 28:
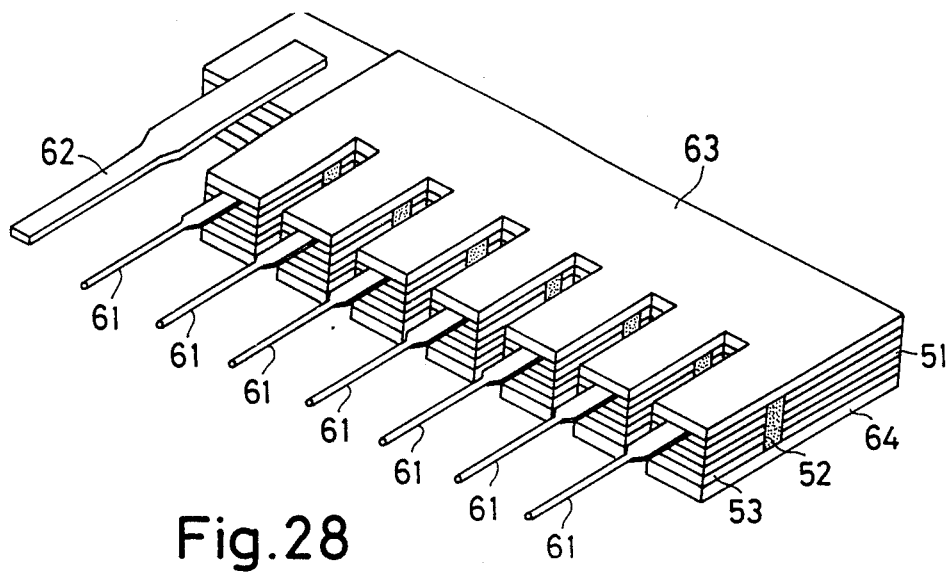
FIG. 28 is a perspective view showing the structure of a multi-layered array-type solid electrolytic capacitor according to the invention.
Figure 29:
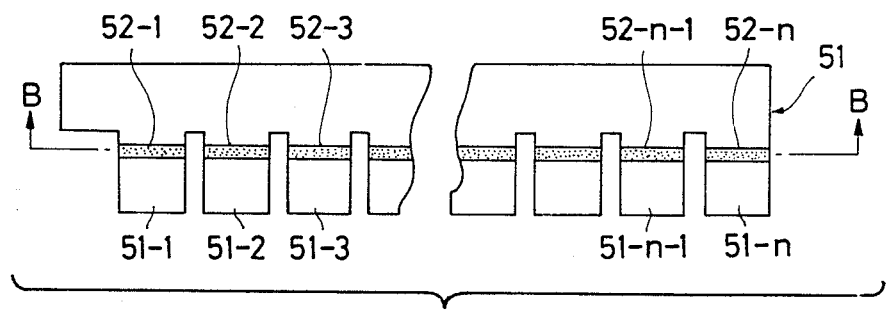
FIG. 29 is a plan view showing a metal plate serving as a substrate on which a dielectric oxidation layer is capable of being formed.
Figures 32, 33:
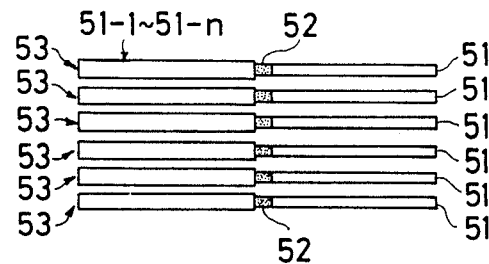
FIG. 32 is a side view of the arrangement shown in FIG. 31.
FIG. 33 is a view showing the results of a comparison between the present embodiment and a conventional ceramic array-type capacitor.

FIGS. 28 through 32 are views showing the structure of a multi-layered array-type solid electrolytic capacitor according to the invention, in which FIG. 28 is a perspective view, FIG. 29 a plan view showing a metal plate serving as a substrate on which a dielectric oxidation layer is capable of being formed, FIG. 30(A) an enlarged plan view showing a portion of the metal plate, FIG. 30(B) a sectional view taken along line A—A of FIG. 30(A), FIG. 31 a front view illustrating a case where six array-type solid electrolytic capacitor elements are stacked, and FIG. 32 a side view of the arrangement shown in FIG. 31.

In these Figures numeral 51 denotes a metal plate serving as a substrate capable of having a dielectric oxidation layer formed theron. In this embodiment, the metal plate 51 is an aluminum plate. The aluminum plate 51 has its surface roughened by an etching treatment. A plurality of rectangular projections 51-1, 51-2, ... 51-n are formed on one longitudinal side edge of the plate.

Resist layers 52-1, 52-3, ... 52-n are formed on the peripheral surfaces of the projections 51-1, 51-2, ... 51-n at predetermined portions. Each of the projections 51-1, 51-2, ... 51-n is divided into a distal end and a base end by respective ones of the resist layers 52-1, 52-3, ... 52-n.

As shown in FIG. 30 (which is an enlarged plan view of the projection 51-1), an aluminum oxiide ($Al_2O_3$) layer 57, which serves as a dielectric layer, a polymer layer 58 of a heterocyclic compound serving as an electrolyte, a thin-film graphite layer 59 and a silver paste layer 60, which constitute a conductive layer for electrode extraction, are formed successively, through a method described below, on the projections 51-1, 51-2, ... 51-n at the distal end sides thereof defined by the resist layers 52-1, 52-3, ... 52-n.

Thus is obtained an array-type solid electrolytic capacitor element plate 53 having the aluminum oxide ($Al_2O_3$) layer 57, which serves as a dielectric oxidation layer, the polymer layer 58 of the heterocyclic compound, the thin-film graphite layer 59 and the silver paste layer 60 formed on the projections 51-1, 51-2, ... 51-n of the aluminum plate 51. As shown in FIGS. 31 and 32, a plurality (six in the illustration) of these array-type solid electrolytic capacitor element plates 53 are stacked, the projections 51-1, 51-2, ... 51-n are subjected to pressure and the silver paste layers 60 are hardened or provisionally dried, thereby integrating the projections 51-1, 51-2, ... 51-n. The aluminum plates 51 are joined together by being welded.

As shown in FIG. 28, the ends of terminals 61, 61, ... are connected to respective ones of the silver paste layers 60 formed on the projections 51-1, 51-2, ... 51-n of the integrated laminated containing the stacked plurality of array-type solid electrolytic capacitor element plates 53. The terminals 61 are connected to the projections as by the application of heat and pressure. An insulator plate 63 is affixed to the laminate to cover the connected ends of the terminals 61 and this side of the laminate.

An insulator plate 64 is affixed to the opposite side of the laminate as well. A terminal 62 is connected to the end portion of the aluminum plates 51 as by welding. This completes the fabrication of a multi-layered array-type solid electrolytic capacitor element.

If necessary, the above-described array-type solid electrolytic capacitor element can be cladded in its entirety, with the exception of the distal ends of the terminals 61, 62, by a molded resin or the like, thereby completing the fabrication of a multi-layered array-type solid electrolytic capacitor.

The method of manufacturing the array-type solid electrolytic capacitor element plate 53 will now be described. After the resist layers 52-1, 52-2, ... 52-n are formed on the peripheral surfaces of the predetermined portions of projections 51-1, 51-2, ... 51-n on the aluminum plate 51 whose surface has been subjected to an etching treatment, the plate is masked above the line B—B in FIG. 29 and the thin-film aluminum oxide layer 57 is formed on the plate by a well-known formation process.

After the thin-film aluminum oxide ($Al_2O_3$) layer 58 is formed, the polymer layer 58 of the heterocyclic compound is formed by dipping in an electrolyte solution containing e.g. pyrrole and ammonium borodisalicylate (ABS) and in which acetonitrile is the solvent, adopting the vessel (usually stainless steel) containing the electrolyte solution as the cathode and the aluminum plate 51 as the anode, and supplying a predetermined direct current thereto.

As a result, electrochemical polymerization takes place in the electrolyte solution so that a polypyrrole layer is formed on the thin-film aluminum oxide layer 57 on the surface of the aluminum plate 51. The thickness of the polypyrrole layer is 20–50 μm.

In the present embodiment, ABS is used in forming the polypyrrole layer. However, since the pyrrole polymer layer or polypyrrole layer formed by electrochemical polymerization on the dielectric oxidation layer such as the aluminum oxide layer 57 is a polypyrrole compound in which the N-H groups of the pyrrole molecules and the supporting electrolyte are hydrogen bonded, the electrolytic polymerization should be carried out in an electrolyte solution which includes pyrrole and the supporting electrolyte. Use should be made of a supporting electrolyte containing boric acid and any one of the following ingredients:

(1) an aliphatic acid, aromatic carboxylic acid or salt thereof;
(2) an aliphatic or aromatic compound, or salt thereof, having two or more carbonyl groups;
(3) an aliphatic or aromatic organic compound, or salt thereof, having at least one hydroxyl (—OH) group and at least one carboxylic acid (—COOH) group; and
(4) an aliphatic or aromatic organic compound, or salt thereof, having at least one amine (—NH$_2$) group and at least one carboxylic acid (—COOH) group.

It is of course possible to use a boron compound obtained by chemically combining boric acid and the abovementioned (1) through (4) as the supporting electrolyte.

To form the thin-film graphite layer 59 and silver paste layer 60 on the polymer layer 58 of the heterocyclic compound comprising the polypyrrole layer, the portion having the polypyrrole layer formed thereon is dipped into a graphite solution so as to be coated with the graphite solution, after which the graphite on the polypyrrole layer is allowed to harden to form the thin-film graphite layer 59. The resulting structure is then dipped into a silver paste solution to coat the graphite layer with the silver paste. This is then allowed to harden to form the silver paste layer 60. This completes the fabrication of the array-type solid electrolytic capacitor element plate 53.

FIG. 33 is a view showing the results of a comparison between the present embodiment and a conventional ceramic array-type capacitor. As shown in FIG. 33, it has been confirmed that while the array-type solid electrolytic capacitor of the present embodiment exhibits a slightly increased tan δ, capacitance is doubled with approximately the same leakage current.

Figure 34:
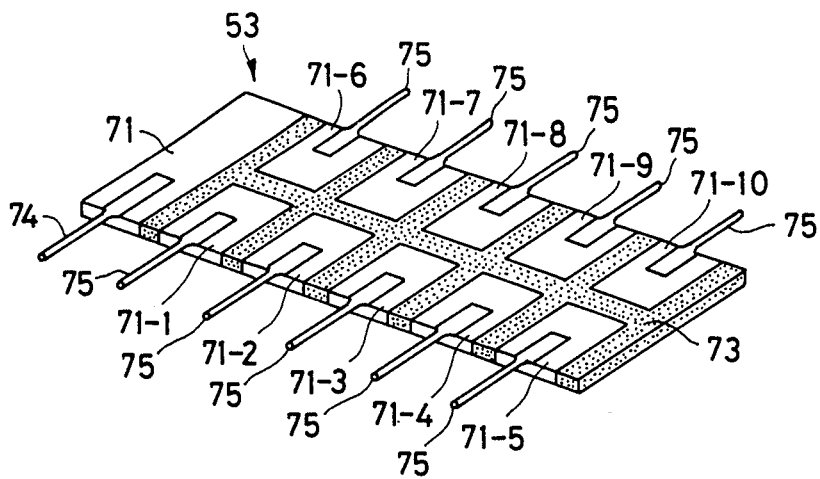
FIG. 34 is a view showing the structure of another array-type solid electrolytic capacitor element according to the invention.

FIG. 34 is a view illustrating the shape of another array-type solid electrolytic capacitor element plate 53 according to the invention. As shown in FIG. 34, an aluminum plate 71 the surface of which is roughened by etching is used as a metal plate capable of having a dielectric oxidation layer formed thereon. A resist layer 73 is formed on the top and bottom surfaces of the aluminum plate 71 so as to define a plurality of surfaces 71-1 through 71-10 at which the aluminum plate 71 is exposed, each of these surfaces being continuous from the obverse side to the reverse side of the aluminum plate 71.

An aluminum oxide layer serving as the dielectric oxidation layer, a pyrrole layer serving as the polymer layer of a heterocyclic compound, and a graphite layer and silver paste layer serving as the conductive layer are successively formed, through a method similar to that described earlier, on each of the exposed surfaces 71-1 through 71-10. This completes the fabrication of an array-type solid electrolytic capacitor element plate.

A terminal 75 is attached to the silver paste layer formed on each of the exposed surfaces 71-1 through 71-10 of the aluminum plate 71 constituting the array-type solid electrolytic capacitor element plate, and a terminal 74 is attached to a portion of the aluminum plate 71 on which the resist layer 73 has not been formed. This completes the fabrication of a single-plate array-type solid electrolytic capacitor element.

Figure 35:
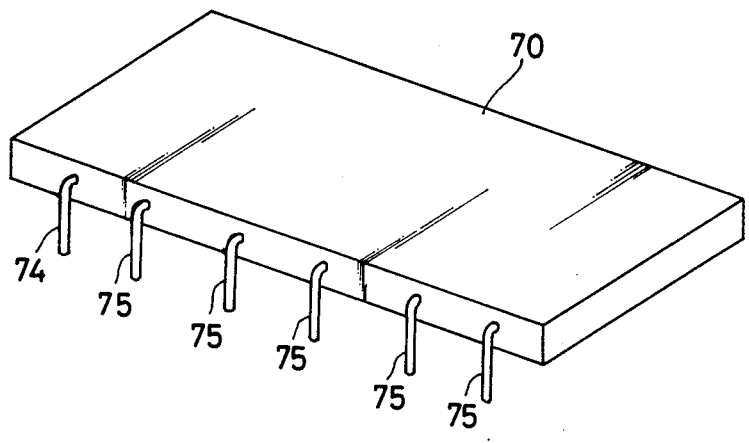
FIG. 35 is a view showing the external appearance of a single-plate array-type solid electrolytic capacitor in which a resin molded cladding is formed on the array-type solid electrolytic capacitor element.

A cladding consisting of molded resin or the like is formed on this array-type solid electrolytic capacitor element, and the terminals 74 and 75, 71, . . . are bent downwards to complete the fabrication of a single-plate array-type solid electrolytic capacitor having the structure shown in FIG. 35.

Figure 36:
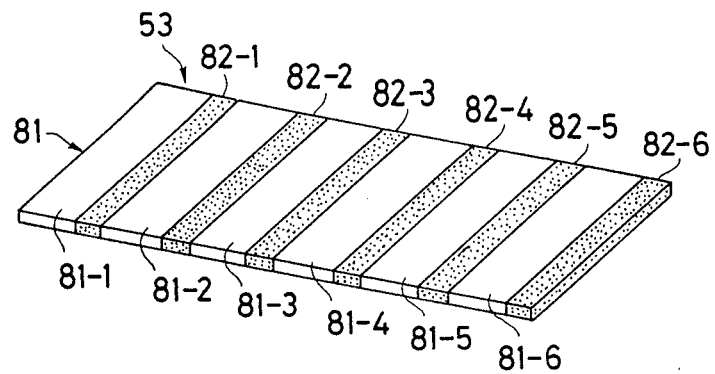
FIG. 36 is a view showing the structure of another array-type solid electrolytic capacitor element plate according to the invention.
Figure 37:
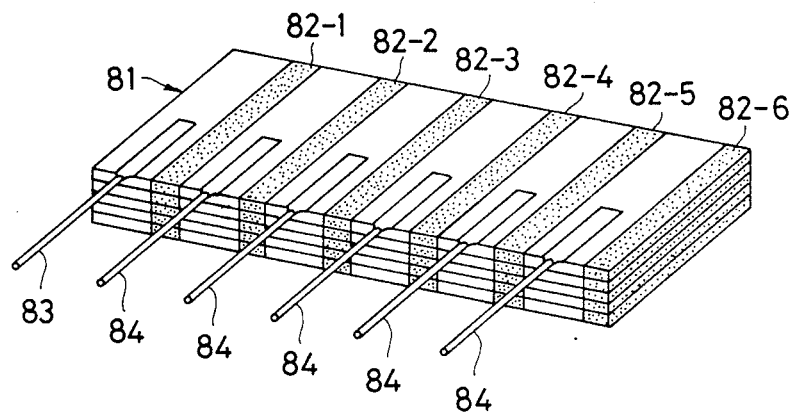
FIG. 37 is a view illustrating the structure of a multi-layered array-type solid electrolytic capacitor element obtained by stacking the array-type solid electrolytic capacitor element plates.

FIG. 36 is a view illustrating the shape of another array-type solid electrolytic capacitor element plate 53 according to the invention. As shown in FIG. 36, an aluminum plate 81 the surface of which is roughened by etching is used as a metal plate capable of having a dielectric oxidation layer formed thereon. Resist layers 82-1 through 82-6 are formed on the entire periphery of the aluminum plate 81 at predetermined portions thereof so as to define a plurality of surfaces 81-1 through 81-6 at which the aluminum plate 81 is exposed, each of these surfaces being continuous from the obverse side to the reverse side of the aluminum plate 71.

An aluminum oxide layer serving as the dielectric oxidation layer, a pyrrole layer serving as the polymer layer of a heterocyclic compound, and a graphite layer and silver paste layer serving as the conductive layer are successively formed, through a method similar to that described earlier, on each of the exposed surfaces 81-2 through 81-6, leaving the exposed surface 81-1 as is. This completes the fabrication of an array-type solid electrolytic capacitor element plate.

A plurality of the above-described array-type solid electrolytic capacitor element plates are stacked in such a manner that the portions corresponding to the exposed surfaces 81-1 through 81-6 are aligned with one another, and the exposed surfaces 81-1 through 81-6 are subjected to heating and pressure, thereby hardening the silver paste layers to integrate the plurality of array-type solid electrolytic capacitor element plates. The exposed surfaces 81-1 of the aluminum plates 81 are joined together as by welding.

A terminal 81 is attached to the exposed surfaces 81-1 of the resulting laminate as by welding, and terminals 84, 84, . . . are attached to respective ones of the silver paste layers formed on the exposed surfaces 81-2 through 81-6 of the laminate as by soldering or hardening of the silver paste. This completes the fabrication of a multi-layered array-type solid electrolytic capacitor element.

A cladding consisting of a molded resin or the like is formed on this array-type solid electrolytic capacitor element, thereby completing the fabrication of a multi-layered array-type solid electrolytic capacitor (not shown).

Though an aluminum plate whose surface has been etched is used as the metal plate serving as the capacitor base in the above-described embodiment, it is permissible to use an unetched aluminum plate and then etch only those portions on which the aluminum oxide layer is to be formed, thereby roughening the surfaces of these portions.

In the above-described embodiment, an aluminum plate is used as the metal plate on which the dielectric oxidation layer is capable of being formed. However, if the metal is e.g. tantalum, niobium or titanium, a dielectric oxidation layer can be formed thereon. It goes without saying, therefore, that even these metals can be employed.

Further, the polymer layer 58 of the heterocyclic compound is not limited to pyrrole, for a heterocyclic compound such as furan or thiophene can also be used.

By constructing the array-type solid electrolytic capacitor in the manner described above, the polymer layer of the heterocyclic compound serving as the electrolyte can be formed with ease by the electrochemical polymerization in the solvent including the heterocyclic compound such as pyrrole, furan or thiophene. This makes it possible to readily manufacture array-type solid electrolytic capacitors having a large capacitance.

Since management of the manufacturing process is easy, array-type solid electrolytic capacitors of uniform quality can be obtained.

Since the polymer layer of a heterocyclic compound is used as an electrolyte, it is possible to obtain an array-type solid electrolytic capacitor having a low ESR and little leakage current.

If the multi-layered structure is adopted, array-type solid electrolytic capacitors having different capacitances can readily be manufactured by changing the number of layers.

The above-described array-type solid electrolytic capacitor is non-polar, i.e. it does not exhibit polarity in a prescribed voltage range. In connection with the multi-layered array-type solid electrolytic capacitor shown in FIG. 28, it has been experimentally confirmed that approximately the same leakage current-voltage characteristics are obtained even if terminal 62 is used as the anode or cathode and, conversely, the terminals 61 are used as cathodes or anodes.

As many apparently widely different embodiments of the present invention can be made without departing from the spirit and scope thereof, it is to be understood that the invention is not limited to the specific embodiments thereof except as defined in the appended claims.

What we claim is:
1. A solid electrolytic capacitor characterized by having a capacitor element comprising:
   a metal plate capable of having a dielectric oxidation layer formed thereon;
   an insulator layer of a desired shape formed on a predetermined portion of said metal plate;
   a dielectric oxidation layer formed on a surface of said metal plate at one portion thereof defined by said insulator layer;
   a conductive polymer layer formed on said dielectric oxidation layer which is a polymer layer of a heterocyclic compound selected from the group consisting of pyrrole, furan and thiopene formed by electrochemical polymerization in an electrolyte solution containing said heterocyclic compound and supporting electrolyte which either comprises boric acid and any one of the following organic compounds:
   (1) an aliphatic or aromatic carboxylic acid, or a salt thereof;
   (2) an aliphatic or aromatic compound having two or more carbonyl radicals, or a salt thereof;
   (3) an aliphatic or aromatic compound having at least one hydroxyl radical and at least one carboxylic radical, or a salt thereof; and
   (4) an aliphatic or aromatic compound having at least one amine radical and at least one carboxylic radical, or a salt thereof; or comprises a boron compound obtained by chemically combining boric acid and any of the compounds (1) to (4);
   a conductive layer formed on said polymer layer;
   a first terminal attached to another portion of said metal plate defined by said insulator layer; and
   a second terminal attached to said conductive layer.

2. The solid electrolytic capacitor according to claim 1, wherein said metal plate is selected from the group consisting of an aluminum thin plate, a tantalum thin plate, a niobium thin plate and a titanium thin plate.

3. The solid electrolytic capacitor according to claim 1, wherein said polymer layer is a polypyrrole layer formed by electrochemical polymerization in an electrolyte solution containing pyrrole and a supporting electrolyte.

4. The solid electrolytic capacitor according to claim 1, wherein said conductive layer comprises a graphite layer and a silver paste layer.

5. The solid electrolytic capacitor according to claim 1, wherein said conductive layer comprises a graphite layer and a silver paste layer, and said silver paste layer laminated portions are integrated by application of pressure and hardening.

6. A method of manufacturing a solid electrolytic capacitor characterized in that a capacitor element is manufactured by the following steps;
   forming an insulator layer of a desired shape on a predetermined portion of each of a plurality of projections formed with predetermined spacing therebetween on the side edge of a strip-shaped metal plate capable of having a dielectric oxidation layer formed thereon;
   successively forming a dielectric oxidation layer, a conductive polymer layer of a heterocyclic compound and a conductive layer on a surface of one portion of each projection defined by the insulator layer;
   severing said projections from a base portion; and
   attaching a first terminal to another portion of the severed projection defined by the insulator layer and a second terminal to said conductive layer, wherein the heterocyclic compound of the conductive polymer layer is a member of the group consisting of pyrrole, furan and thiopene.

7. The method according to claim 6, wherein said polymer layer is a polypyrrole layer and said polypyrrole layer is formed by electrochemical polymerization in an electrolyte solution containing pyrrole, borodisalycylic acid or borodisalicylate.

8. The method according claim 6, wherein at least one of the terminal spacing and terminal extraction direction is freely adjusted by changing a position at which the insulator layer is formed on each of said projections and the shape of the insulator layer.

9. The method according to claim 6 or 8, wherein said projections are formed on both side edges of the strip-shaped metal plate.

10. A solid electrolytic capacitor characterized by having a multilayer capacitor element comprising:
 a plurality of metal plates capable of having a dielectric oxidation layer formed thereon;
 an insulator layer of a desired shape formed on a first portion of said metal plates;
 a dielectric oxidation layer formed on a surface of said metal plates at the first portion thereof defined by said insulator layer;
 a conductive polymer layer formed on said dielectric oxidation layer which is a polymer layer of a heterocyclic compound selected from the group consisting of pyrrole, furan and thiopene formed by electrochemical polymerization in an electrolyte solution containing said heterocyclic compound and supporting electrolyte which either comprises boric acid and any one of the following organic compounds:
  (1) an aliphatic or aromatic carboxylic acid, or a salt thereof;
  (2) an aliphatic or aromatic compound having two or more carbonyl radicals, or a salt thereof;
  (3) an aliphatic or aromatic compound having at least one hydroxyl radical and at least one carboxylic radical, or a salt thereof; and
  (4) an aliphatic or aromatic compound having at least one amine radical and at least one carboxylic radical, or a salt thereof; or comprises a boron compound obtained by chemically combining boric acid and any of the compounds (1) to (4);
 a conductive layer formed on said polymer layer;
 the plurality of said metal plates being stacked into a laminate in such a manner that the first portions defined by said insulator layer are made to correspond and second portions defined by said insulator layer are made to correspond;
 said laminate being integrated by application of pressure thereto, and said metal plates at the second portions defined by said insulator layers of said laminate being joined;
 a first terminal attached to another portion of said metal plate defined by said insulator layer; and
 a second terminal attached to said conductive layer.

11. A solid electrolytic capacitor characterized by having a capacitor element comprising:
 a plurality of metal plates capable of having a dielectric oxidation layer formed thereon;
 an insulator layer of a desired shape formed on a first portion of said metal plates;
 a dielectric oxidation layer formed on a surface of said metal plates at the first portion thereof defined by said insulator layer;
 a conductive polymer layer formed on said dielectric oxidation layer which is a polymer layer of a heterocyclic compound selected from the group consisting of pyrrole, furan and thiopene formed by electrochemical polymerization in an electrolyte solution containing said heterocyclic compound and supporting electrolyte which either comprises boric acid and any one of the following organic compounds:
  (1) an aliphatic or aromatic carboxylic acid, or a salt thereof;
  (2) an aliphatic or aromatic compound having two or more carbonyl radicals, or a salt thereof;
  (3) an aliphatic or aromatic compound having at least one hydroxyl radical and at least one carboxylic radical, or a salt thereof; and
  (4) an aliphatic or aromatic compound having at least one amine radical and at least one carboxylic radical, or a salt thereof; or comprises a boron compound obtained by chemically combining boric acid and any of the compounds (1) to (4);
 a conductive layer formed on said polymer layer;
 the plurality of said metal plates being stacked into a laminate in such a manner that the first portions defined by said insulator layer are made to correspond and second portions defined by said insulator layer are made to correspond, with conductive plates being interposed between said first portions;
 said second portions defined by said insulator layers being joined to one another and said conductive plates being joined to one another to form joints; and
 terminals attached to the respective joints.

12. The solid electrolytic capacitor according to claim 10 or 11, wherein said metal plate is selected from the group consisting of an aluminum thin plate, a tantalum thin plate, a niobium thin plate and a titanium thin plate.

13. The solid electrolytic capacitor according to claim 11, wherein said conductive layer comprises a graphite layer and a silver paste layer, said conductive plates are interposed between said silver paste layers, and said silver paste layers and conductive plates are stacked and integrated by application of pressure and hardening.

14. The solid electrolytic capacitor according to claim 11, wherein said conductive plate comprises a thin plate of copper.

15. The solid electrolytic capacitor according to claim 10 or 11, wherein distal ends of said terminals are extended to a bottom portion of a housing to form the capacitor into a chip-type capacitor.

16. The solid electrolytic capacitor according to claim 10 or 11, wherein said terminals are extended to an external portion of a housing to form the capacitor into a lead terminal-type capacitor.

17. The solid electrolytic capacitor according to claim 10 or 11, wherein said terminals are extended to an external portion of a housing from both sides thereof to form the capacitor into a four terminal-type capacitor.

18. A method of manufacturing a solid electrolytic capacitor characterized in that a capacitor element is manufactured by the following steps:
 forming an insulator layer on a predetermined portion of each of a plurality of projections formed with a predetermined spacing therebetween at least on one side edge of a metal plate capable of having a dielectric oxidation layer formed thereon;
 successively forming a dielectric oxidation layer, a conductive polymer layer of a heterocyclic compound and a conductive layer on a first portion of side metal plate defined by the insulator layer;
 stacking a plurality of said metal plates into a laminate in such a manner that the first portions defined by said insulator layers correspond and second portions defined by said insulator layers correspond;
 applying pressure to and integrating the conductive layers of said laminate;

joining, at each and every projection, said metal plates at the other portions defined by said insulator layers each of said projections of said laminate;

cutting said laminate between the projections to form individual element laminates; and attaching a first terminal to a portion of the conductive layers of said element laminate and a second terminal to a portion of said metal plates that have been joined together.

19. The method according to claim 18, wherein said steps of applying pressure to and integrating the projections of said laminate comprises the steps of hardening said silver paste layers and joining and integrating said projections of said laminate.

20. A method of manufacturing a solid electrolytic capacitor characterized in that a capacitor element is manufactured by the following steps:

forming an insulator layer on a predetermined portion of each of a plurality of projections formed with a predetermined spacing therebetween at least on one side edge of a metal plate capable of having a dielectric oxidation layer formed thereon;

successively forming a dielectric oxidation layer, a conductive polymer layer of a heterocyclic compound and a conductive layer on a first portion of said metal plate defined by the insulator layer;

stacking a plurality of said metal plates into a laminate in such a manner that said projections are made to correspond to one another, with conductive plates being interposed between the conductive layers of the first portions defined by said insulating layers;

applying pressure to and integrating the conductive layers of said laminate;

joining said conductive plates and said metal plates of said integrated laminate;

cutting said laminate at predetermined portions to form individual laminates; and attached a first terminal to a portion of the conductive layers of said element laminate and a second terminal to a portion of said metal plates of said element laminate.

21. The method according to claim 18 or 20, wherein said metal plate is strip-shaped and said projections are formed on one or both side edges thereof.

22. The method according to claim 18 or 20, wherein said step of forming the polymer layer comprises the step of forming a polypyrrole layer by carrying out electrochemical polymerization in an electrolyte solution containing pyrrole and a supporting electrolyte.

23. The method according to claim 18 or 20, wherein said step of forming the conductive layer comprises:

dipping said metal plate in a graphite solution and hardening to form a graphite layer, and dipping said metal plate in a silver paste solution and hardening to form said silver paste layer.

24. The method according to claim 20, wherein said steps of applying pressure to and integrating the projections of said laminate comprises the steps of hardening said silver paste layers and joining and integrating said silver paste layers and said conductive plates.

25. A solid electrolytic capacitor characterized by having an array-type electrolytic capacitor element comprising:

a metal plate capable of having a dielectric oxidation layer formed thereon;

an insulator layer formed on said metal plate;

a plurality of metal exposing surfaces defined on said metal plate by said insulator layer, each metal exposing surface being continuous from an obverse side to reverse side of said metal plate;

a dielectric oxidation layer formed on all but at least one of said plurality of metal exposing surfaces;

a conductive polymer layer formed on said dielectric oxidation layer which is a polymer layer of a heterocyclic compound selected from the group consisting of pyrrole, furan and thiopene formed by electrochemical polymerization in an electrolyte solution containing said heterocyclic compound and supporting electrolyte which either comprises boric acid and any one of the following organic compounds:

(1) an aliphatic or aromatic carboxylic acid, or a salt thereof;

(2) an aliphatic or aromatic compound having two or more carbonyl radicals, or a salt thereof;

(3) an aliphatic or aromatic compound having at least one hydroxyl radical and at least one carboxylic radical, or a salt thereof; and (4) an aliphatic or aromatic compound having at least one amine radical and at least one carboxylic radical, or a salt thereof; or comprises a boron compound obtained by chemically combining boric acid and any of the compounds (1) to (4);

a conductive layer formed on said conductive polymer layer;

a first terminal provided on the at least one of said metal exposing surfaces not having said dielectric oxidation layer formed thereon; and second terminals provided on said conductive layer formed on respective ones of said metal exposing surfaces.

26. The solid electrolytic capacitor according to claim 25, wherein said metal plate is selected from the group consisting of an aluminum plate, a tantalum plate, a niobium plate and a titanium plate.

27. The solid electrolytic capacitor according to claim 25, wherein said polymer layer is a polypyrrole layer formed by electrochemical polymerization in an electrolyte solution containing pyrrole and a supporting electrolyte.

28. The solid electrolytic capacitor according to claim 25, wherein said conductive layer comprises a graphite layer and a silver paste layer.

29. The solid electrolytic capacitor according to claim 25, wherein a resin molded cladding is formed on said array-type solid electrolytic capacitor element.

30. A solid electrolytic capacitor having a multilayer array-type solid electrolytic capacitor element comprising:

a metal plate formed to include a variety of projections of a predetermined shape on at least one side edge thereof, said metal plate capable of having a dielectric oxidation layer formed thereon;

an insulator layer formed on a predetermined portion of each of said projections;

a dielectric oxidation layer formed on the surface of the tip of each of said projections defined by said insulator layer;

a conductive polymer layer formed on said dielectric oxidation layer which is a ploymer layer of a heterocyclic compound selected from the group consisting of pyrrole, furan and thiopene formed by electrochemical polymerization in an electrolyte solution containing said heterocyclic compound and supporting electrolyte which either comprises boric acid and any one of the following organic compounds:
(1) an aliphatic or aromatic carboxylic acid, or a salt thereof;
(2) an aliphatic or aromatic compound having two or more carbonyl radicals, or a salt thereof;
(3) an aliphatic or aromatic compound having at least one hydroxyl radical and at least one carboxylic radical, or a salt thereof; and
(4) an aliphatic or aromatic compound having at least one amine radical and at least one carboxylic radical, or a salt thereof; or comprises a boron compound obtained by chemically combining boric acid and any of the compounds (1) to (4);

a conductive layer formed on said conductive polymer layer;

a plurality of said metal plates being stacked in such a manner that the projections thereof are made to correspond to on another, said stacked plates being integrated by application of pressure thereto;

a first terminal provided on said stacked metal plates; and a second terminals provided on said conductive layer formed on the tip ends of said projection defined by said insulator layers on said projections.

31. The solid electrolytic capacitor according to claim 30, wherein said metal plate is selected from the group consisting of an aluminum plate, a tantalum plate, a niobium plate and a titanium plate.

32. The solid electrolytic capacitor according to claim 30, wherein said polymer layer is a polypyrrole layer formed by electrochemical polymerization in an electrolyte solution containing pyrrole and a supporting electrolyte.

33. The solid electrolytic capacitor according to claim 30, wherein said conductive layer comprises a graphite layer and a silver paste layer.

34. A solid electrolytic capacitor having a multilayer array-type solid electrolytic capacitor element comprising:

a metal plate capable of having a dielectric oxidation layer formed thereon;

an insulator layer formed on said metal plate;

a plurality of metal exposing surfaces defined on said metal plate by the insulator layer, each metal exposing surface having the same shape and being continuous from an obverse side to a reverse side of said metal plate;

a dielectric oxidation layer formed on all but at least one of said plurality of metal exposing surfaces;

a conductive polymer layer formed on said dielectric oxidation layer which is a polymer layer of a heterocyclic compound selected from the group consisting of pyrrole, furan and thiopene formed by electrochemical polymerization in an electrolyte solution containing said heterocyclic compound and supporting electrolyte which either comprises boric acid and any one of the following organic compounds:
(1) an aliphatic or aromatic carboxylic acid, or a salt thereof;
(2) an aliphatic or aromatic compound having two or more carbonyl radicals, or a salt thereof;
(3) an aliphatic or aromatic compound having at least one hydroxyl radical and at least one carboxylic radical, or a salt thereof; and
(4) an aliphatic or aromatic compound having at least one amine radical and at least one carboxylic radical, or a salt thereof; or comprises a boron compound obtained by chemically combining boric acid and any of the compounds (1) to (4);

a conductive layer formed on said conductive polymer layer;

a plurality of said metal plates being stacked in such a manner that the conductive layers thereof are made to correspond to one another, said stacked plates being integrated by application of pressure thereto;

a first terminal provided on the at least one of said metal exposing surfaces of said stacked metal plates not having a dielectric oxidation layer formed thereon; and a second terminals provided on the surface of the conductive layers, or provided between these conductive layers, formed on respective ones of said metal exposing surfaces of the stacked metal plates.

35. The solid electrolytic capacitor according to claim 34, wherein said metal plate is selected from the group consisting of an aluminum plate, a tantalum plate, a niobium plate and a titanium plate.

36. The solid electrolytic capacitor according to claim 34, wherein said polymer layer is a polypyrrole layer formed by electrochemical polymerization in an electrolyte solution containing pyrrole and a supporting electrolyte.

37. The solid electrolytic capacitor according to claim 34, wherein said conductive layer comprises a graphite layer and a silver paste layer.

* * * * *